United States Patent Office 2,935,488
Patented May 3, 1960

2,935,488

EPOXIDE COMPOSITIONS AND RESINS THEREFROM

Benjamin Phillips and Paul S. Starcher, Charleston, and Charles W. McGary, Jr., and Charles T. Patrick, Jr., South Charleston, W. Va., assignors to Union Carbide Corporation, a corporation of New York No Drawing. Application January 22, 1957
Serial No. 635,090

42 Claims. (Cl. 260—45.4)

This invention relates to novel epoxide compositions and to resins formed therefrom. More particularly, this invention relates to a novel class of epoxide compositions comprising bis(2,3-epoxycyclopentyl) ether and polyglycidyl polyethers of polyhydric phenols and curable mixtures and resins obtained therefrom.

In the synthetic resins art, it is known that specific epoxides and resins therefrom can be made. These epoxides include the reaction products of epichlorhydrin and dihydric phenols, and can be made into resins having special properties which fit special applications. In most cases these specific epoxides, even with additional modifications, are limited in one way or another in their applicability to only a narrow range of uses. Viscosity, for example, to a large degree limits the uses to which these epoxides or formulations containing these epoxides can be put. In the manufacture of coatings, as an example, it is desirable to use coating formulations which have ranges of viscosities which are neither so low that the formulation flows off of the surface being coated nor so high that it is arduous or impossible to conveniently apply it. Even within this desirable viscosity range one or more than one segment or sub-range thereof may be particularly desirable depending upon the coating thickness required or the means to be used in applying the formulation. Illustratively, thin coatings may be obtained through the use of formulations having viscosities in the lower sub-ranges whereas thicker coatings may be obtained by using formulations with viscosities in the higher sub-ranges. Also, if the coating is to be applied by spraying, a low viscosity formulation is preferable and when the coating is to be applied by brushing or wet lay-up procedures, a higher viscosity formulation is more useful. Similarly, the viscosities of these epoxides or formulations containing them are largely determinative of the fields of use to which they may be put, for example, in the casting, molding or bonding arts and the like. Illustratively, in casting or molding, low viscosity epoxide formulations which quickly and completely fill intricacies of molds are preferred. Low viscosity formulations capable of accepting up to large amounts of solid materials, e.g., fillers and pigments, are desirable in coating applications as well as in casting, molding or bonding applications. Other, higher viscosity epoxide formulations may be wanted in bonding applications, for example, as adhesives or for manufacturing laminates. Adjustments to the epoxide or epoxide formulation viscosity, which may be possible by increasing the temperature of the epoxide or epoxide formulation, or by the addition of non-reacting solvents or reactive diluents, tend to cause additional problems in preparing, applying and curing the formulations and, in many cases, add new limitations to the physical and chemical properties of resins made from such formulations, thereby restricting their usefulness. In preparing such epoxide formulations increases in epoxide temperatures to reduce the viscosities of said epoxides for mixing with other components, such as, hardeners, promote premature and localized curing, the expulsion of formulation components or high exothermic heat accumulations during subsequent curing which can internally damage resins. In addition, the application and curing of such epoxide formulations are made more difficult and expensive. When non-reacting solvents are employed to reduce viscosities additional procedures and costly equipment need to be employed to remove the solvent when converting the epoxide formulation to a resin. Some solvent may be entrained in the resin, or may produce bubbles which are entrained in the resin, thereby causing irregularities and weak points. Unremovable amounts of such entrained bubbles and solvent bring about defects in the physical properties, e.g., flexural strength, hardness, impact strength, heat distortion value, of resins containing them and, additionally, provide sites for attack by chemicals. Although reactive diluents may be employed to reduce viscosities, the differences of functionality, reactivity and/or volatility of the reactive diluent and the epoxide or epoxide formulation can be instrumental in causing irregularities and defects in resins made therefrom. Monofunctional diluents can cause undue shrinkage and drastic reductions in physical properties such as those previously mentioned, of resins formed from formulations containing them. Difunctional diluents of low reactivity may be in effect only physically entrained in resins made from formulations diluted thereby and cause reductions in resin properties. Highly reactive diluents may greatly increase the exotherms encountered when converting formulations containing them to resins. Uncontrolled exotherms can cause thermal decomposition of some formulation components as can be evidenced by charring and cause the expulsion of other components as can be evidenced by bubble formation and foaming. Volatile reactive diluents can be readily expelled from the formulations and similar to the effects of non-reactive solvents, form bubbles and foam. Other reactive diluents are extremely toxic and, hence, are not conducive to safe use in making resins.

Our invention provides a new class of epoxide compositions which can be made as solids or liquids having a wide range of viscosities extending upwards from about 36 centipoises at room temperatures, i.e., at temperatures of about 25° C. to 30° C. The viscosities of our liquid compositions can be controlled, as desired, without the aid of such external modifications as raising the temperature or using non-reacting solvents or reactive diluents and the like, although such modifications may be employed, if desired. Our compositions can be made with the capability of accepting wide varieties of solid materials, such as, fillers and pigments. Our liquid compositions are particularly noteworthy in being capable of accepting large amounts of solid material without at the same time entraining large amounts of air or causing damage to the solid material particles. Our compositions can be polymerized by ionic catalysts, such as, mineral acids, metal halide Lewis acids or the strong bases. They can be reacted with active hydrogen containing compounds, for example, carboxylic acids, amines, phenols, alcohols, thiols and the like and carboxylic anhydrides to provide a large variety of useful articles. The compositions of our invention have improved pot-lives which can be controlled, as desired, to fit specific needs. Such compositions can be made so as to cure rapidly or to be capable of storage without incurring appreciable gelation for extended periods prior to use whichever the manufacturing techniques being employed may demand. The lowest temperatures at which our compositions can be easily cured may be adjusted, as desired, and compositions having minimum curing temperatures as low as 20° C. to 30° C. and lower can be made in accordance with our invention. Our compositions are curable to resins which are uniform and do not contain foam, entrained solvent or bubbles. Exothermic heat evolved during the curing of our compositions is within easily controllable limits and expensive equipment or extra procedures for removing excess heat is not required, although they may be used if desired. During the curing of our compositions very little, if any, shrinkage occurs and resinous articles having intricately molded surfaces can be manufactured therefrom.

Our resins can be made as infusible products which are insoluble in most chemicals and which have remarkable resistance to attack by strong acids and bases. These resins can be made also into tough, strong products having unusual flexibility and which can be machined to a variety of shapes or polished to provide appealing finishes. In the form of coatings or laminates they are capable of tenaciously adhering to a wide variety of materials including such non-porous materials as glass and metals and have low coefficients of thermal expansion. Resins having improved flexural strengths and impact resistances can be made by our invention. Improved heat strengths are characteristic of resins which can be made from our compositions. Such resins are capable of supporting heavy loads at high temperatures and have heat distortion points as high as 180° C. and higher. Our resins can be made also as hard articles having improved resistances to scratching and wear. They can be made in appealing colors with good color retention properties, and are useful in the manufacture of a variety of articles having decorative appearances.

Our epoxide compositions can be made by mixing bis(2,3-epoxycyclopentyl) ether with polyglycidyl polyethers of polyhydric phenols. By the term "polyglycidyl polyethers of polyhydric phenols," as used herein, is meant a polyepoxide having terminal epoxy groups, one or more aromatic nucleus or nuclei and at least two aliphatic groups including terminal epoxy-containing aliphatic groups, the aliphatic groups being united to said aromatic nucleus or nuclei through carbon to oxygen to carbon linkages. For brevity, these polyglycidyl polyethers of polyhydric phenols are also hereinafter referred to as polyglycidyl polyethers. By the terms "epoxy group, epoxide or polyepoxide," as used herein, is meant a group or compound which contains adjacent carbon atoms to which oxirane oxygen is attached, for example,

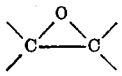

It has been found advantageous to perform the mixing at a temperature which is not less than the softening point, or melting range, of the polyglycidyl polyether, although lower temperatures may be used if desired. Mixing can be facilitated by using higher temperatures and agitation. These mixtures can be employed immediately or stored for long periods without appreciable increases in viscosity or other signs of polymerization. They can be made as homogeneous solids or homogeneous liquids which remain homogeneous and have been found not to form separate phases despite changes in temperature. Compositions having many desired viscosities can be obtained by adjusting the relative proportions of bis(2,3-epoxycyclopentyl) ether and polyglycidyl polyether. Those compositions which contain larger amounts of bis(2,3-epoxycyclopentyl) ether have been found to have lower viscosities than those which contain smaller amounts of bis(2,3-epoxycyclopentyl) ether. Viscosities of our compositions can also be controlled through the selection of polyglycidyl polyethers, such that higher viscosity compositions can be made from higher viscosity polyglycidyl polyethers and lower viscosity compositions are obtainable from lower viscosity polyglycidyl polyethers. The melting points or softening ranges of our solid compositions have been found to be lower than those of their highest melting components. In addition the softening ranges of these solid compositions can be controlled by adjustments in the relative proportions of bis(2,3-epoxycyclopentyl) ether and polyglycidyl polyethers, those compositions containing larger amounts of bis(2,3-epoxycyclopentyl) ether having lower melting points than those compositions containing smaller relative amounts of bis(2,3-epoxycyclopentyl) ether. Preferred epoxide compositions of our invention contain from 0.01 to 10.0 molar parts of bis(2,3-epoxycyclopentyl) ether for each 100 parts by weight of polyglycidyl polyether. Resins having particularly valuable strength properties, such as, high flexural strengths and high compressive yields, can be obtained from our epoxide compositions, for example, those which contain from 0.1 to 1.0 molar parts of bis(2,3-epoxycyclopentyl) ether for each 100 parts by weight of polyglycidyl polyether.

Our curable mixtures can be obtained by mixing our epoxide compositions with ionic catalysts or with cross-linking compounds. By the term "cross-linking compounds," as used herein, is meant organic compounds which contain two or more groups to the molecule which are reactive with epoxy groups. In forming our curable mixtures, the catalyst or cross-linking agent is preferably mixed with our epoxide compositions so as to form curable mixtures which are homogeneous. Our curable mixtures may be cured at room temperature, or higher temperatures to form resins. We have found that the pot-lives of our curable mixtures can be controlled to fit various particular needs by varying the relative proportions of bis(2,3-epoxycyclopentyl) ether and polyglycidyl polyether contained by the epoxide compositions employed in such mixtures. Illustratively, compositions which contain larger relative amounts of bis(2,3-epoxycyclopentyl) ether have been found to require longer times to gel when mixed with a catalyst or cross-linking compound than compositions containing smaller relative amounts of bis-(2,3-epoxycyclopentyl) ether when mixed with the same amount of the same catalyst, or equivalent amounts of the same cross-linking compound, and subjected to the same conditions.

In forming our curable mixtures from catalysts and our epoxide compositions, an advantageous method is to add the catalyst to the composition at the lowest temperature required to form a liquid mixture. Mixing temperatures of 20° C. to 30° C. have been found to be advantageous. Stirring then can be employed to obtain a homogeneous, curable mixture. If desired, higher temperatures may be employed with, however, the possibility of inducing premature and localized curing around catalyst particles prior to the formation of a homogeneous, curable mixture. In most cases it may be desirable to obtain a homogeneous mixture before bringing about any substantial degree of curing and in such instances low mixing temperatures of the order specified above should be employed. Catalyst concentrations and curing temperatures are believed to affect the curing rate, the higher concentrations and temperatures promoting faster cures than the lower ones. Catalyst concentrations can be varied over a broad range and can be selected on the basis of the rate of cure desired and the curing temperature to be used. It has been found, however, that catalyst concentrations from about 0.1 to 20 weight percent based on the weight of epoxide composition are advantageous in forming valuable thermoset resins from our compositions at temperatures of not less than about 20° C. to 30° C. Although higher concentrations may be used, there appears to be no particular advantagxe to be obtained. Preferred catalyst concentrations are within the range of about 0.5 to about 10 weight percent based on the weight of epoxide composition. Our mixtures of our epoxide compositions and catalysts can be cured at temperatures of up to 250° C. Temperatures over 250° C. may be used when desired, even though discoloration, which may be undesirable, may be caused. Discoloration which may be induced at temperatures over 250° C. can be reduced to a minimum, however, by lowering the catalyst concentration in the curable mixture. In the preferred method of curing, the mixture is brought to a temperature of about 50° C. to 160° C. until a gel, or partially cured solid, is formed. After formation of the gel, the temperature of the mixture is then maintained at an approximate temperature within the range of 100° C. to 200° C. to complete the cure. Although this is the preferred method, other single temperatures or combinations of temperatures, preferably, none of which are higher than 250° C. can be used for curing.

In forming our curable mixtures from cross-linking compounds and our epoxide compositions, it is advantageous to first mix the cross-linking compound in liquid form with the epoxide composition in liquid form. When the cross-linking compound and epoxide composition are both in the liquid state at temperatures below about 30° C., they can be simply mixed together at temperatures preferably in the range of 20° C. to 30° C. and stirred to form a homogeneous, curable mixture. Higher temperatures may be used for mixing and in fact can facilitate the mixing, particularly when the cross-linking compound or the epoxide composition or both are in the solid states below about 30° C. It is preferable to employ mixing temperatures which are elevated just high enough to place both the cross-linking compound and epoxide compositions in the liquid states, so as to avoid any substantial degree of premature curing. Inasmuch as premature curing may not be disadvantageous and in fact may be desirable in particular circumstances, temperatures which are higher than those required to place both the cross-linking compound and epoxide composition in liquid states can be used. Methods other than the preferred method for preparing curable mixtures from our epoxide compositions and cross-linking compounds may be used, if desired. For example, solvents or reactive diluents can be employed to place the cross-linking compound and epoxide composition in liquid form below about 30° C., or the cross-linking compound or epoxide composition or both may be mixed in other than liquid form, as desired. The relative amounts of cross-linking compound and epoxide composition can be varied between widely separated limits. Our resins can be advantageously produced by employing an amount of cross-linking compound which contains an approximately sufficient number of epoxy-reactive groups to react with approximately all of the epoxy groups contained by the amount of epoxide composition being used. Temperatures for effecting cures can be varied as desired but those below about 250° C. are preferred. Higher temperatures encourage a faster rate of cure while the lower temperatures effect a slower rate of cure. An advantageous method of curing these curable mixtures is to maintain the mixture at temperatures in the range of 20° C. to 160° C. until a gel, or partially cured solid, is formed. This gel is then maintained at a temperature in the 100° C. to 200° C. range to complete the cure. Other single curing temperatures or combinations of curing temperatures can be used. Catalysts can also be employed to quicken the rate of cure. Higher catalyst concentrations promote faster curing rates than lower concentrations. Although catalyst concentrations over a wide range may be used, it is preferred to employ them in concentrations of up to 5.0 weight percent of epoxide composition.

BIS(2,3-EPOXYCYCLOPENTYL) ETHER

Bis(2,3-epoxycyclopentyl) ether is a liquid diepoxy dicyclic aliphatic ether having a viscosity of about 28 centipoises at 27° C. and a boiling point of about 200° C. The preparation of this diepoxide involves what can be termed epoxidation, or the controlled oxidation, of the double bonds of bis(2-cyclopentenyl) ether which, itself, can be made from cyclopentadiene by the successive steps of hydrochlorination and alkaline hydrolysis. More specifically, bis(2-cyclopentenyl) ether can be prepared from the reaction of cyclopentadiene with hydrogen chloride in a suitable solvent, e.g., benzene, or without a solvent, for a period of about one hour at a low temperature, such as 0° C. to −15° C., thereby forming 1-chloro-2-cyclopentene. Subsequently, 1-chloro-2-cyclopentene can be subjected to alkaline hydrolysis with an aqueous solution of sodium carbonate or sodium hydroxide at a temperature of the order of 40° C. to 60° C. to form bis(2-cyclopentenyl) ether. A substantially pure bis(2-cyclopentenyl) ether then can be obtained by any suitable separation procedure, for example, fractional distillation.

Suitable epoxidizing agents for the epoxidation reaction include peracetic acid and acetaldehyde monoperacetate. The epoxidation reaction can be advantageously carried out by charging bis(2-cyclopentyl) ether to a reaction vessel and then gradually adding the epoxidizing agent. In order to provide ease of handling and to avoid the formation of highly concentrated or crystalline peracetic acid with its attendant explosion hazard, the epoxidizing agent preferably is employed as a solution in a suitable solvent, as for example, acetone, chloroform, methylethyl ketone, ethyl acetate, butyl acetate, and the like. The reaction can be carried out at a temperature within the range of about −25° C. to 150° C., although lower and higher temperatures may be used. However, longer reaction times are needed at the lower temperatures to produce high yields. At the higher temperatures, side reactions form undesirable materials which can be removed, however, by suitable purification procedures, such as, fractional distillation. The reaction is continued until an analysis for epoxidizing agent indicates that an amount at least sufficient to epoxidize all the double bonds of the bis(2-cyclopentenyl) ether has been consumed. In this connection it is desirable to employ an excess over the theoretical amount of peracetic acid to assure complete epoxidation. Upon discontinuance of the reaction, by-products, solvent and unreacted material are removed by any convenient procedure, such as, by adding a potboiler, e.g., ethylbenzene, and stripping low-boiling materials. A liquid material, identified as bis(2,3-epoxycyclopentyl) ether, is obtained. This product partially solidifies on standing at room temperature for 1 to 3 days which indicates the possible formation of a solid position isomer. This semi-solid bis(2,3-epoxycyclopentyl) ether can be liquefied by melting at a temperature of 30° C. to 35° C. and will remain a liquid for a period of several days at room temperature.

POLYGLYCIDYL POLYETHERS

Polyglycidyl polyethers which can be advantageously used in our compositions can be characterized by their epoxy equivalents and melting points, or melting point ranges. By the term "epoxy equivalent," as used herein, is meant the weight of polyglycidyl polyether which contains one mole of epoxy group. The epoxy equivalent can be determined by heating a one gram sample of the polyglycidyl polyether with a pyridine solution containing a known quantity of pyridine hydrochloride for about one hour and titrating with sodium hydroxide or potassium hydroxide to determine the amount of unreacted pyridine hydrochloride. From this, the amount of pyridine hydrochloride that has reacted with the epoxy groups of the polyglycidyl polyether can be calculated. From these data the number of grams of polyglycidyl polyether per epoxy group contained thereby, that is the epoxy equivalent, can be determined by taking one mole of pyridine hydrochloride as equivalent to one mole of epoxy group. By the term "melting points, or melting point ranges," as used herein, is meant the temperature at, or the range of temperatures within, which the polyglycidyl polyether transforms from the solid state to the liquid state or from the liquid state to the solid state by heating or cooling, respectively. Melting point ranges, as used herein, were determined by the Durran's Mercury Method.

Many methods are known in the art for preparing polyglycidyl polyethers. They can be advantageously prepared by the reaction of halohydrins, such as, monohalohydrins, polyhalohydrins, epihalohydrins and the like, with polyhydric phenols. An advantageous method for such a preparation is to heat a dihydric phenol with epichlorhydrin in the presence of sufficient caustic alkali, or other strong aqueous alkali, e.g., potassium hydroxide, to combine with the chlorine of epichlorhydrin. It is preferable to use a stoichiometric excess of alkali so as to insure the complete combination of chlorine. Theoretically, one mole of epichlorhydrin will react with one hydroxyl group of polyhydric phenol to form the polyglycidyl polyether of the phenol. For example, two moles of epichlorhydrin are theoretically required to react with one mole of a dihydric phenol to form the diglycidyl diether of the phenol. In practice, however, a higher ratio than two moles of epichlorhydrin per mole of dihydric phenol is required and up to 10 moles of epichlorhydrin per mole of dihydric phenol has been required in order to form the diglycidyl diether of the phenol. The chain length and extent of polymerization can be varied by changing the mole ratio of epichlorhydrin to dihydric phenol within the range of 10:1 to 1.2:1. Thus, by decreasing the mole ratio of epichlorhydrin to dihydric phenol from 10 towards 1.2, polyglycidyl polyethers having longer chain lengths, higher epoxy equivalents and higher softening points can be obtained. The reaction can be carried out by adding the dihydric phenol, epichlorhydrin and aqueous alkali together, by adding epichlorhydrin to a mixture of dihydric phenol and aqueous alkali, by adding a mixture of dihydric phenol and aqueous alkali to epichlorhydrin, or by adding aqueous alkali in stages to a mixture of less than equivalent amount of aqueous alkali, dihydric phenol and epichlorhydrin or by other methods. The reaction proceeds exothermically and the temperature of the reaction mixture rises. The reaction temperature can be preferably controlled at from 25° C. to 100° C. by regulating the amount of water in the aqueous alkali added or by cooling the walls of the reaction vessel with a circulating cooling medium or by any other suitable cooling means. Toward the end of the reaction the addition of heat may be required to maintain the temperature of the reaction mixture at the desired level within the range from 50° C. to 100° C. The overall reaction time can be made to vary from thirty minute to three hours or more depending upon the temperature, proportion of reactants and method of mixing the reactants. During the reaction, the reaction mixture separates into an upper layer and a residue. When the reaction is concluded the upper aqueous layer can be drawn off leaving a residue. The residue can then be freed from the sodium chloride formed as a by-product of the reaction. This can be accomplished by dissolving in a suitable inert solvent such as, benzene, toluene, xylene and the like, followed by filtration and distillation of the solvent. This method is advantageous when the residue is soluble, or partially soluble, in hot water, for example, residues which are predominantly composed of the diglycidyl diethers of the phenolic reactant such as can be formed by using greater than 2 to 1 molar ratios of epichlorhydrin to phenol in the reaction mixture. Residues that are insoluble in hot water, for example, semi-solid to solid residues which are composed of long chain polyethers such as can be formed from about a 2 to 1, or less than 2 to 1 molar ratio of epichlorhydrin to phenol in the reaction mixture, can be washed with water of a temperature of about 10° C. below the softening point of the residue. In this water wash, dilute acids, such as acetic acid or hydrochloric acids, may be used to neutralize any alkali remaining. Inasmuch as alkali and basic salts, such as sodium chloride or sodium acetate, tend to induce further polymerization upon the application of heat, it is advantageous to remove substantially all of these impurities by washing or other means. Separation by fractional distillation under reduced pressure is a particularly satisfactory means for removing the impurities of alkali, salts and other foreign material from the polyglycidyl polyether residues, if the boiling point characteristics of the polyether permit such a procedure. In this procedure the residue from the reaction is dissolved in benzene, or other suitable solvent and washed with alkali and water to remove water-soluble impurities. The solvent is then stripped off and the residue is fractionally distilled under reduced pressure to obtain a polyether epoxide which is substantially free of impurities.

The lower molecular weight polyglycidyl polyethers which can be formed as described above can be further polymerized by heating with less than equivalent amounts of the same, or different polyhydric phenol, to form longer chain polyglycidyl polyethers. For example, a diglycidyl diether of a dihydric phenol can be mixed with a less than equivalent amount of the same or different dihydric phenol. Inasmuch as the diglycidyl diether of a dihydric phenol contains two epoxy groups, an equivalent amount in moles of additional dihydric phenol is equal to the molar quantity of said diglycidyl diether, inasmuch as, theoretically, one epoxy group of a polyether epoxide will react with one hydroxyl group of a polyhydric phenol. The equivalent amount of polyhydric phenol, therefore, may be based upon the epoxy group content, or epoxy equivalent, of the polyglycidyl polyether. In further polymerizing polyhydric phenols and low molecular weight polyglycidyl polyethers formed by the reaction of a halohydrin and a polyhydric phenol, the phenol and epoxide can be mixed and heated with or without a catalyst. By heating the mixture without a catalyst, polymerization takes place but at a slower rate. Catalysts suitable for accelerating the rate of reaction include alkalis and alkaline reacting substances, acids, salts; basic nitrogen compounds, metallic surfaces and the like. Illustratively, such catalysts are lithium hydroxide, sodium hydroxide, potassium hydroxide, calcium oxide, ammonia, dimethylamine, trimethylamine, triethylamine, 1,3-propanediamine, dimethylaminomethylphenol, hexamethylenetetramine, other mono- or di- or triamines, quaternary ammonium compounds, sodium acetate, boron trifluoride, phosphoric acid, copper and a variety of others.

Typical halohydrins which can be used in the preparation of the polyglycidyl polyethers include monohalohydrins, such as, 3-chloro-1,2-propanediol, polyhalohydrins, e.g., glycerol dichlorhydrin, bis(3-chloro-2-hydroxylpropyl) ether, bis(3-chloro-2-methyl-2-hydroxypropyl) ether, 2-methyl-2-hydroxy-1,3-dichloropropane, 1,4-dichloro-2,3-dihydroxybutane, and the like, and epihalohydrins, such as, epichlorhydrin which is preferred.

Illustrative of polyhydric phenols which can be used in preparing polyglycidyl polyethers for use in our compositions are mononuclear phenols and polynuclear phenols. Typical polyhydric phenols include resorcinol, catechol, hydroquinone, phlorglucinol and the like. Typical polynuclear phenols include p,p'-dihydroxydibenzyl, p,p'-dihydroxydiphenyl, p,p'-dihydroxyphenyl sulfone, p,p'-dihydroxybenzophenone, 2,2'-dihydroxy-1,1'-dinaphthylmethane, and the 2,2'; 2,3'; 2,4'; 3,3'; 3,4'; and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, dihydroxydiphenyldicyclohexylmethane, dihydroxydiphenylcyclohexane, polyhydric phenolic formaldehyde condensation products, and the like. Preferred polyglycidyl polyethers are those which contain as reactive groups only epoxy groups and hydroxyl groups. These preferred polyglycidyl polyethers have melting points or melting point ranges of not greater than 160° C.

CATALYSTS

Suitable catalysts which can be employed in the epoxide compositions of this invention to promote the curing of said compositions to resins include basic and acidic catalysts. Typical basic catalysts are benzyldimethylamine, benzyltrimethylammonium hydroxide, dilute alkali hydroxides, and the like. Representative of acidic catalysts useful in promoting the curing of these epoxide compositions are the mineral acids, such as, sulfuric acid, phosphoric acid, perchloric acid, polyphosphoric acid, and the various sulfonic acids, e.g., toluene sulfonic acid, benzene sulfonic acid, and the like; and the metal halide Lewis acids, such as stannic chloride, zinc chloride, boron trifluoride, aluminum chloride, ferric chloride, and the like. These various metal halide catalysts can be employed in the form of complexes of Lewis acid such as, the etherates and amine complexes, wherein the acid catalyst becomes effective under specific conditions as by dissociation upon heating to a high temperature. Typical metal halide Lewis acid complexes are, for example, piperidine-borontrifluoride, monoethylamine borontrifluoride, and borontrifluoride-ether complexes.

It is preferable to employ the curing catalyst, when desired as a solution in a suitable solvent. Typical solvents for the acidic catalysts include organic ethers, such as, diethyl ether, dipropyl ether, 2-methoxy-1-propanol, organic esters, e.g., methyl acetate, ethyl acetate, ethyl propionate, organic ketones, e.g., acetone, methylisobutyl ketone, cyclohexanone, organic alcohols, e.g., methanol, cyclohexanol, propylene glycol, and the like. The mineral acids may be employed as solutions in water, whereas, however, metal halide Lewis acids tend to decompose in water and, thus, aqueous solutions of such Lewis acids are not to be preferred. Representative of solvents which may be used for the basic catalysts are methanol, ethylene glycol, glycerine, and dioxane as well as water.

CROSS-LINKING COMPOUNDS

As cross-linking compounds, organic compounds having two or more groups which are reactive with epoxy groups can be mixed with our epoxide compositions to form curable mixtures. Such curable mixtures can be cured to form valuable resins by using such curing procedures as those specified herein.

Typical groups which are reactive with epoxy groups are active hydrogen groups such as hydroxyl groups, carboxy groups, amino groups, thiol groups, and the like, isocyanate groups, isothiocyanato groups, halide atoms of acyl halides, and the like. Oxydicarbonyl groups such as those contained by polycarboxylic acid anhydrides are also reactive with epoxy groups. One oxydicarbonyl group will react with two epoxy groups and, in this connection, polycarboxylic acid anhydrides need only contain one oxydicarbonyl group in order to function as a cross-linking compound with our epoxide compositions. Stated in other words, one oxydicarbonyl group of an anhydride is equivalent to two epoxy-reactive groups.

Representative cross-linking compounds include polyfunctional amines (A), polycarboxylic acids (B), polycarboxylic acid anhydrides (C), polyhydric phenols (D), and polyhydric alcohols, such as those hereinafter specified, or mixtures thereof, e.g., polycarboxylic acid anhydride-polyol mixtures (E); and polythiols such as 1,2-ethanedithiol, 1,3-propanedithiol, 1,4-butanedithiol; thiol alcohols such as 2-mercaptoethanol; mercapto-acids, such as mercaptoacetic acid, alpha-mercaptopropionic acid, gamma-mercapto-alpha,beta-dimethylbutyric acid; polyisocyanates, such as, methylene bis(4-phenylisocyanate), hexamethylene diisocyanate, tolylenediisocyanate; polythioisocyanates such as methylene bis(4-phenylthioisocyanate); polyacylhalides such as phthaloylchloride, succinyl chloride; hydroxycarboxylic acids such as glycolic acid, hydroxybutyric acid, mandelic acid; and the like.

POLYFUNCTIONAL AMINES (A)

As cross-linking compounds for our epoxide compositions, polyfunctional amines have been found to be particularly useful. By the term "polyfunctional amines," as used herein, is meant organic compounds having at least one nitrogen atom and at least two active amino hydrogen atoms which can be on the same or on different nitrogen atoms. Curable mixtures can be formed as previously described from our epoxide compositions and polyfunctional amines at temperatures in the 20° C. to 30° C. range, and higher, if desired. Although the epoxide compositions can be mixed in various other relative proportions, we have found that resins having particularly valuable properties, such as those set forth above, can be formed from mixtures containing our epoxide compositions and polyfunctional amines in such relative proportions as provide from 0.2 to 4.0 amino hydrogens of the amine for each epoxy group contained by said epoxide composition. It is preferred, to form our resins from curable mixtures containing our epoxide compositions and polyfunctional amines which provide from 0.5 to 2.5 amino hydrogens for each epoxy group. These curable mixtures are capable of being cured at temperatures as low as 20° C. in times extending up to several days after mixing. Temperatures above 20° C. can be used, when higher curing rates are desired, or for any other purpose. Temperatures over 250° C., however, are not preferred. Acidic or basic catalysts, such as those set forth previously, can be added to these curable mixtures to increase the rate of cure, the higher catalyst concentrations effecting faster cure than lower concentrations. Resins formed from curable mixtures containing our epoxide compositions and polyfunctional amines are particularly valuable in that they are infusible, solvent- and chemical-resistant, capable of tenaciously adhering to a variety of materials, hard and flexible. These curable mixtures are particularly useful for applications wherein high temperatures cannot be employed in curing but wherein resins having the advantageous properties set forth above are desired.

Typical polyfunctional amines include the aliphatic primary amines, such as ethylamine, isopropylamine, n-butylamine, isobutylamine, 2-ethylhexylamine, monoethanolamine, monoisopropanolamine, beta alanine, cyclohexylamine, amides, e.g., formamide, acetamide propionamide, n-butyramide, stearamide, and the like; aromatic primary amines, such as, aniline, alpha-methylbenzylamine, and the like; heterocyclic primary amines, such as, N-aminoethyl morpholine, N-aminopropyl morpholine; the aliphatic polyamines, such as, ethylenediamine, diethylenetriamine, triethylenetetramine, tetraethylenepentamine, polyethylenepolyamines, propylenediamine, dipropylenetriamine, polypropylenepolyamines, butylenediamines, pentylenediamines, hexylenediamines, octylenediamines, nonylenediamines, decylenediamines, dimethylurea, 1,3-diamino-2-propanol, 3,3'-imino-bis-(propylamine), guanidine, and the like; aromatic polyamines, such as meta- ortho-and para-phenylenediamines, 1,4 - naphthalenediamine, 1,4 - anthradiamine, 3,3' - biphenyldiamine, xylylenediamine, 3,4-biphenylamine, 3,4-toluenediamine, alpha,alpha'-biparatoluidine, para,para'-methylenedianiline, 1-methoxy-6-methylmeta - phenylenediamine, para, para'-sulfonyldiamine, and the like; and heterocyclic polyamines, such as piperazine, 2,5-dimethylpiperazine, melamine, 2,4 - diamine - 5 - (aminomethyl)pyrimidine, 2,4,6 - triaminopyrimidine, 3,9 - bis (aminoethyl) spirobi-metadioxane, and the like.

Other polyfunctional amines includes the low molecular weight polyamides which are condensation products of polycarboxylic acids, in particular, hydrocarbon dicarboxylic acids, with polyamines, particularly, diamines, such as those monomeric diamines previously listed. Typical polyamides are prepared in accordance with known condensation procedures from adipic acid and hexamethylenediamine, dilinoleic acid and ethylenediamine, terephthalic acid and diethylenetriamine, and the like.

Still other illustrations of polyfunctional amines are the addition products or adducts, of polyamines, in particular diamines and triamines, and low molecular weight epoxides containing oxirane oxygen linked to vicinal carbon atoms, such as, ethylene oxide, propylene oxide, butadiene dioxide, diglycidyl ether, epoxidized soybean oil, epoxidized safflower oil, and the like, and polyglycidyl polyethers of polyhydric phenols. Particularly useful polyfunctional amines are the mono-and poly-hydroxyalkyl polyalkylene polyamines which can be prepared by the addition reaction of polyalkylene polyamines, preferably, ethylenediamine, propylenediamine, diethylenetriamine, dipropylenetriamine or triethylenetetramine and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include N-hydroxyethylethylenediamine, N,N'-bis(hydroxyethyl) ethylenediamine, N-bis(hydroxyethyl)diethylenetriamine, N,N-bis(hydroxyethyl)diethylenetriamine, N,N''-bis(hydroxyethyl)diethylenetriamine, N - hydroxypropyldiethylenetriamine, N,N - bis(hydroxypropyl)diethylenetriamine, N,N'' - bis(hydroxypropyl)diethylenetriamine, N - hydroxyethylpropylenediamine, N-hydroxypropylpropylenediamine, N - hydroxyethyldipropylenetriamine, N,N - bis (hydroxyethyl)dipropylenetriamine, N,N - bis(hydroxyethyl) dipropylenetriamine, tris(hydroxyethyl)triethylenetetramine and the like. Other particularly useful epoxide-polyamine adducts can be prepared with known procedures by the addition reaction of polyglycidyl polyethers of dihydric phenols and the polyamines, in particular, polyalkylene polyamines. Of particular importance in forming these epoxide polyamine adducts are the diglycidyl diethers of dihydric phenols, such as for example, the isomers of dihydroxydiphenylmethanes singularly or mixed and the dihydroxydiphenyldimethylpropanes singularly or mixed. Mixtures of diglycidyl polyethers of dihydric phenols containing a predominance of diglycidyl diethers of dihydric phenols can be prepared by reacting epichlorhydrin with a dihydric phenol using a molar excess of epichlorhydrin over the theoretical molar requirement. Substantially pure cuts of the diglycidyl diethers then can be obtained by fractional distillation under reduced pressure, for example. Illustratively, the polyfunctional amine or epoxide-polyamine adduct itself can be prepared by mixing the diglycidyl polyether of a dihydric phenol with a polyalkylene diamine such as diethylenetriamine, dipropylenetriamine and the like, and bringing to an elevated temperature up to about 200° C. and maintaining at such an elevated temperature for a period of from 4 to 5 hours. Alternatively, as an illustration, polyfunctional amines or epoxide polyamine adducts can be prepared by adding a diglycidyl diether of a dihydric phenol to a polyalkylene polyamine over a period of time, around three to four hours, while maintaining the reaction mixture at an elevated temperature, for example, up to about 200° C. and subsequently adding a dihydric phenol.

Additional polyfunctional amines include the low molecular weight addition products of a polyamine, preferably a polyalkylene polyamine such as those listed above and a vinyl group-containing compound. Typical vinyl group-containing compounds are, for example, ethylene, propylene, 1-butene, isobutene, acrolein, vinyl chloride, vinylidene chloride, vinyl acetate, acrylonitrile, styrene and the like. These polyfunctional amines or vinyl polyamine adducts can be prepared in accordance with known procedures by reacting a polyamine and a vinyl group-containing compound in various proportions at a temperature in the range from 20° C. to 100° C. and removing unreacted materials and low boiling materials by vacuum distillation.

Other polyfunctional amines having a total of at least two active amino hydrogen atoms to the molecule can be advantageously employed in the epoxide compositions of this invention. For example, such polyfunctional amines as mixtures of para,para'-methylenedianiline and metaphenylenediamine or other mixtures of two or more polyfunctional amines can be used. Particularly valuable resins made in accordance with this invention are obtainable from our epoxide compositions and polyfunctional amines as described above which have melting points or melting point ranges below about 150° C.

POLYCARBOXYLIC ACIDS (B)

Valuable resins can be made also from our epoxide compositions and polycarboxylic acids. By the term "polycarboxylic acid," as used herein, is meant a compound having two or more carboxyl groups to the molecule. Curable mixtures can be formed from our epoxide compositions and polycarboxylic acids. These mixtures can be formed at temperatures ranging from 25° C. to 150° C. and higher, if desired. In an advantageous method, the epoxide composition and polycarboxylic acid are mixed at room temperatures. This mixture is then made homogeneous by stirring or by heating or by both stirring and heating. It has been found that mixtures containing low-melting polycarboxylic acids which are liquids at room temperature can be made homogeneous by stirring only, although warming ten degrees or fifteen degrees centigrade above room temperature aids in forming the homogeneous mixtures. Mixtures containing high-melting polycarboxylic acids which are semisolids or solids at room temperature can be advantageously made homogeneous by stirring and heating just to the melting point or melting point range of the polycarboxylic acid. Higher temperatures, however, can be used in forming homogeneous curable mixtures, if desired. These curable mixtures can be cured at temperatures from 50° C. to 250° C. Temperatures over 250° C. can be used, if desired, but they are not preferred. Lower temperatures encourage slower curing rates than higher temperatures. The rate of cure of these mixtures can be increased by the addition thereto of acidic catalysts, such as those specified hereinabove. Catalyst concentrations of up to 5.0 weight percent based on the weight of epoxide composition have been found to be adequate. However, higher concentrations can be used, if desired. Higher catalyst concentrations promote faster curing rates than lower catalyst concentrations.

While not wishing to be held to any particular theory or mechanics of reaction, it is believed that polycarboxylic acids react with the epoxy groups of the epoxide composition and aliphatic hydroxyl groups formed by the reaction of epoxy groups with polycarboxylic acids, except when stringent curing conditions, such as, temperatures over about 100° C. or 200° C. and high catalyst concentrations are used during the cure. Under such stringent conditions polycarboxylic acids are believed to also esterify aliphatic hydroxyl groups attached to the polyglycidyl polyether molecules contained by the epoxide compositions forming water and ester linkages connecting the acid and polyglycidyl polyether molecules. This esterification is believed to provide additional cross-linking in our resins.

Resins formed from curable mixtures containing our epoxide compositions and polycarboxylic acids are resistant to the action of organic solvents, infusible, hard and flexible. Particularly valuable resins can be made from mixtures containing such amounts of our epoxide compositions and polycarboxylic acids as to provide 0.3 to 2.5 carboxyl groups of the acid for each epoxy group contained by the amount of our epoxide composition. It is preferred, however, to make resins from curable mixtures which contain such amounts of polycarboxylic acids and our epoxide compositions as to provide 0.5 to 1.25 carboxyl groups of the acid for each epoxy group from our epoxide composition. In developing special properties, such as different degrees of flexibility, in these resins, polycarboxylic acid anhydrides, such as those hereinafter listed under the title of "Polycarboxylic Acid Anhydrides," can be mixed with the polycarboxylic acid and our epoxide composition prior to curing, thus forming curable mixtures. These curable mixtures contain such amounts of acid, anhydride and epoxide composition as provide not more than 1.5, preferably not more than 0.75, carboxy equivalent from the anhydride and 0.3 to 3.0, preferably 0.5 to 1.5, carboxy equivalent from the combined amounts of acid and anhydride for each epoxy group contained by the amount of our epoxide composition. The respective amounts of polycarboxylic acid and polycarboxylic acid anhydride present in such curable mixtures contain more carboxy equivalents from the acid than from the anhydride. By the term "carboxy equivalents," as used herein, is meant the number of moles of carboxy groups contained by an amount of a polycarboxylic acid or which would be contained by an amount of a polycarboxylic acid anhydride in its hydrous form. For example, one mole of a succinic acid or anhydride contains two carboxy equivalents.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid, ethylidenemalonic acid, isopropylidenemalonic acid, allylmalonic acid, muconic acid, alpha-hydromuconic acid, beta-hydromuconic acid, diglycolic acid, dilactic acid, dithioglycolic acid, 4-amyl-2,5-heptadienedioic acid, 3-hexynedioic acid, 4,6-decadiynedioic acid, 2,4,6,8-decatetraenedioic acid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorphthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, 1,2,4,5-benzenetetracarboxylic acid, benzenepentacarboxylic acid, benzenehexacarboxylic acid and the like.

Also, as polycarboxylic acids useful in our polymerizable compositions there are included compounds containing ester groups in addition to two or more carboxy groups and which can be aptly termed polycarboxy polyesters of polycarboxylic acids, such as those listed above, or the corresponding anhydrides of said acids, with polyhydric alcohols. Stated in other words, by the term "polycarboxy polyesters," as used herein, is meant polyesters containing two or more carboxy groups per molecule. These polycarboxy polyesters can be prepared by known condensation procedures, employing mole ratios favoring greater than equivalent amounts of polycarboxylic acid, or anhydride. More specifically, the amount of polycarboxylic acid, or anhydride, employed in the esterfication reaction should contain more carboxy groups than are required to react with the hydroxyl groups of the amount of polyhydric reactant. Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4-diol, 2-butene-1,4-diol, 2-butyne-1,4-diol, 2,5-dimethyl-3-hexyne-2,5-diol and the like; trihydric alcohols such as glycerol, trimethylolmethane, hexane-1,2,6-triol, 1,1,1-trimethylolpropane, and the like; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl ethers of 2,2-propane bisphenol, and reactive hydrogen-containing organic compounds, e.g., amines, polycarboxylic acids, polyhydric compounds and the like. In forming the polycarboxy polyesters that can be employed in the compositions of this invention it is preferable to use a dihydric, trihydric or tetrahydric aliphatic or oxaaliphatic alcohol. The mole ratios in which the polycarboxylic acid or anhydride can be reacted with polyhydric alcohols in preparing polycarboxylic polyesters useful in our compositions are those which provide polyesters having more than one carboxy group per molecule. In the case of trifunctional and tetrafunctional reactants in the esterfication reaction, the mole ratios of the respective reactants must be such as to avert gelation. The preferred mole ratio ranges of dicarboxylic acid to trihydric or tetrahydric alcohols that have been found to provide polycarboxylic polyesters which can be advantageously used in the compositions of this invention are presented in Table I.

*Table I*

| Polyhydric Alcohol | Mole Ratio of Dicarboxylic Acid or Anhydride to Polyhydric Alcohol |
|---|---|
| Trihydric Alcohol | 2.2 to 3.0 |
| Tetrahydric Alcohol | 3.3 to 4.0 |

It is preferred, however, to employ polycarboxylic polyesters prepared from dicarboxylic acids or anhydrides and polyhydric alcohols in the mole ratios specified in Table II.

*Table II*

| Polyhydric Alcohol | Mole Ratio of Dicarboxylic Acid or Anhydride to Polyhydric Alcohol |
|---|---|
| Trihydric Alcohol | 2.5 to 3.0 |
| Tetrahydric Alcohol | 3.5 to 4.0 |

These polycarboxy polyesters can be obtained by condensing, in accordance with known procedure, a polyhydric alcohol and a polycarboxylic acid or anhydride. This condensation reaction may be conducted, for example, by heating the reactants to a temperature within the range from 100° C. to 200° C. with or without an acidic catalyst. Water formed by the condensation reaction may be removed by distillation. The course of the reaction may be followed by making acid number determinations and the reaction can be stopped when a suitable polycarboxy polyester has been obtained. As preferred polycarboxylic acids, those which are soluble in bis(2,3-epoxycyclopentyl) ether below about 250° C. are advantageously employed.

POLYCARBOXYLIC ACID ANHYDRIDES (C)

Curable mixtures containing our epoxide compositions and polycarboxylic acid anhydrides can also be employed to produce resins having many valuable properties. By the term "polycarboxylic acid anhydride," as used herein, is meant an organic compound containing at least one oxydicarbonyl group, i.e.,

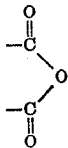

to the molecule. These curable mixtures can be prepared in manners similar to the preparation of curable mixtures of polycarboxylic acids and our epoxide compositions using similar temperature ranges and procedures for obtaining homogeneous mixtures. Acidic or basic catalysts, such as those specified hereinbefore, are effective in increasing the rate of cure of these mixtures. Catalyst concentrations up to 5.0 weight percent based on the weight of epoxide composition have been found to be effective in increasing the rate of cure. Higher catalyst concentrations can be used, if desired, although concentrations of 5.0 weight percent and below have been found to be adequate.

While not wishing to be held to any particular theory or mechanics or reaction, it is believed that polycarboxylic acid anhydrides can esterify aliphatic hydroxyl groups which are attached to polyglycidyl polyether molecules contained by our epoxide compositions in addition to reacting with the epoxy groups of said compositions. Additional cross-linking is believed to be developed in our resins by this esterification.

Resins formed from curable mixtures containing polycarboxylic acid anhydrides and our epoxide compositions are infusible, resistant to attack by organic solvents, hard and flexible. Particularly valuable resins can be made from our mixtures containing such amounts of polycarboxylic acid anhydride and epoxide composition as to provide 0.3 to 3.0 carboxy equivalent of the anhydride for each epoxy group of the epoxide composition. It is preferred, however, to make resins from curable mixtures which contain such amounts of polycarboxylic acid anhydride and epoxide composition as provide 0.75 to 2.3 carboxy equivalent of anhydride for each epoxy group contained by the amount of our epoxide composition. In developing special properties such as different degrees of flexibility in these resins, polycarboxylic acids, such as those hereinbefore listed under the title of "Polycarboxylic Acids," can be mixed with the polycarboxylic acid anhydrides and our epoxide compositions, prior to curings, thus forming curable mixtures. These curable mixtures contain such relative amounts of anhydride, acid and epoxide composition as provide not more than 1.5, preferably not more than 1.15, carboxy equivalent from the acid and 0.3 to 3.0, preferably 0.75 to 2.3, carboxy equivalents from the combined amounts of anhydride and acid for each epoxy group contained by the amount of epoxide composition present. The respective amounts of polycarboxylic acid anhydride and polycarboxylic acid present in such curable mixtures contain at least as many carboxy equivalents from the anhydride as from the acid.

Typical polycarboxylic acid anhydrides include succinic anhydride, glutaric anhydride, propylsuccinic anhydride, methylbutylsuccinic anhydride, hexylsuccinic anhydride heptylsuccinic anhydride, pentenylsuccinic anhydride, octenylsuccinic anhydride, nonenylsuccinic anhydride, alpha, beta-diethylsuccinic anhydride, maelic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylenetetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride, 1,8-tetracarboxylic dianhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and aliphatic compounds having conjugated double bonds. Preferred polycarboxylic acid anhydrides are those which are soluble in bis(2,3-epoxycyclopentyl) ether at temperatures below about 250° C.

POLYHYDRIC PHENOLS (D)

Infusible resins can be also made from curable mixtures of polyhydric phenols and our epoxide compositions. By the term "polyhydric phenol," as used herein, is meant an organic compound which contains at least two phenolic hydroxyl groups to the molecule. The epoxide composition and polyhydric phenol can be mixed in any convenient manner. It is preferred, however, to mix the phenol and epoxide composition in the liquid state so as to obtain a uniform mixture. In forming this mixture, it may be necessary to raise the temperature of the phenol and epoxide composition to at least the melting point or melting point range of the highest melting component. Temperatures below about 150° C. are preferred so as to avoid possible premature curing of these curable mixtures. Stirring also aids the formation of a homogeneous mixture. Acidic or basic catalysts, such as those specified hereinbefore, are effective in increasing the rate of cure of these mixtures. Catalyst concentrations up to 5.0 weight percent based on the weight of epoxide composition have been found to be effective in increasing the rate of cure. Higher catalyst concentrations can be used, if desired, although concentrations of 2.5 weight percent and below have been found to be adequate.

Resins which are resistant to attack by chemicals, hard and flexible can be made from our curable mixtures containing our epoxide compositions and polyhydric phenols. Particularly valuable resins can be made from curable mixtures containing such amounts of phenol and epoxide composition as to provide 0.5 to 2.5 phenolic hydroxyl groups from the polyhydric phenol for each epoxy group from the epoxide composition. It is preferred, however, to make resins from curable mixtures which contain such amounts of phenol and epoxide composition as to provide 0.75 to 1.5 phenolic hydroxyl groups from the polyhydric phenol for each epoxy group of the epoxide composition. Resins having special properties can be made from our curable mixtures which contain our epoxide compositions, polyhydric phenols and polycarboxylic acids or polycarboxylic acid anhydrides.

Typical polyhydric phenols include resorcinol, catechol, hydroquinone, the dihydroxynaphthalenes, the dihydroxyanthracenes, the dihydroxyanthraquinones, the dihydroxytoluenes, the dihydroxyxylenes, chlorohydroquinone, bromohydroquinone, toluhydroquinone, the dihydroxybenzaldehydes, 6,12-dihydroxychrysene, 4-n-hexylresorcinol, 2,4-dihydroxybenzoic acid, phloroglucinol, pyrogallol, hydroxyhydroquinone, n-butyropyrogallol, 1,2,3,5-tetrahydroxybenzenes, tetrahydroxyquinone, 1,2,4-trihydroxyanthraquinones, pentahydroxybenzene, hexahydroxybenzene, p,p'-dihydroxydiphenyl, p,p'-dihydroxydibenzyl, p,p'-dihydroxydiphenyl sulfone, p,p'-dihydroxybenzophenone, di-alpha-napthol, 2,3,4-trihydroxybenzophenone, 2,3'-dihydroxy-1,1'-dinaphthylmethane; the 2,2'; 2,3'; 2,4'; 3,3'; 3,4'; and 4,4' isomers of the following: dihydroxydiphenylmethane, dihydroxydiphenylmethylmethane, dihydroxydiphenyldimethylmethane, dihydroxydiphenylethylmethylmethane, dihydroxydiphenyldiethylmethane, dihydroxydiphenylmethylpropylmethane, dihydroxydiphenylmethylphenylmethane, dihydroxydiphenylethylphenylmethane, dihydroxydiphenylpropylphenylmethane, dihydroxydiphenylbutylphenylmethane, dihydroxydiphenyltolylmethane, dihydroxydiphenyltolylmethylmethane, dihydroxydiphenylcyclohexane, and other diphenylolmethanes, 2,2-bis(4-hydroxy-2-methylphenyl) propane, 2,2-bis(4-hydroxy-2-tertiary-butylphenyl) propane, 2,2-bis(2-hydroxynaphthyl) pentane, polyhydric phenolic-formaldehyde condensation resins and the like.

POLYCARBOXYLIC ACID ANHYDRIDES AND POLYOLS (E)

Resins having many useful properties can be also made from curable mixtures containing our expoxide compositions, polycarboxylic acid anhydrides and polyols. By the term "polyols," as used herein, is meant organic compounds which contain two or more aliphatic hydroxyl groups or phenolic hydroxyl groups to the molecule. These curable mixtures can be prepared in manners similar to the preparations of curable mixtures of polycarboxylic acids and our epoxide compositions using similar tempertures ranges and procedures for obtaining homogeneous mixtures. In forming these curable mixtures the acid anhydride and polyol may be added simultaneously, or in any order desired, to the epoxide composition. Acidic or basic catalysts, such as those specified hereinbefore, are effective in increasing the rate of cure of these mixtures. Catalyst concentrations up to 5 weight percent based on the weight of epoxide composition have been found to be effective in increasing the rate of cure. Higher catalyst concentrations can be used, if desired, although concentrations of 5 weight percent and below have been found to be adequate.

Resins from our curable mixtures containing our epoxide compositions, polyols and polycarboxylic acid anhydrides can be made as tough, flexile products, as hard, rigid products or as products having intermediate flexibility and rigidity. Particularly valuable resins can be made from curable mixtures containing such amounts of polyol, anhydride, and epoxide composition as to provide up to 3.0 aliphatic or phenolic hydroxyl groups of the polyol for each epoxy group of the epoxide composition and 0.33 to 4.00 carboxy equivalents of the anhydride for each epoxy group contained by the amount of epoxide composition. It is preferred, however, to make resins from curable mixtures which contain such amounts of polycarboxylic acid anhydride, polyol, and our epoxide composition as provide up to 1.67 aliphatic or phenolic hydroxyl groups of the polyol for each epoxy group of the epoxide composition and 0.67 to 3.0 carboxy equivalents of the anhydride for each epoxy group contained by the amount of epoxide compositions.

Typical polyols include the polyhydric aliphatic alcohols, ethylene glycol, diethylene glycol, triethylene glycol, tetraethylene glycol, higher polyethylene glycols, 1,2-propylene glycol, 1,3-propylene glycol, dipropylene glycol, tripropylene glycol, higher polypropylene glycols, polyethylene-polypropylene glycols, 1,2-butylene glycol, 1,4-butylene glycol, 1,5-pentanediol, 2,4-pentanediol, 2,2-dimethyltrimethylene glycol, 1,5-hexanediol, 2,5-hexanediol, 1,6-hexanediol, 3-methyl-1,5-pentanediol, 2-methylpentane-2,5-diol, 3-methylpentane-2,5-diol, 1,4-hexanediol, 2,2 - diethyl - 1,3 - propanediol, 2 - methoxymethyl - 2,4-dimethyl-1,5-pentanediol, 2-ethoxymethyl-2,4-dimethyl-1,5-pentanediol, 2-ethyl-1,3-hexanediol, 2,5-dimethyl-2,5-hexanediol, 1,12-octadecanediol, 1-butene-3,4-diol, 2-butene-1,4-diol, 1,5-hexanediene-3,4-diol, 2,6-octadiene-4,5-diol, 2-butyne-1,4-diol, 3-hexyne-2,5-diol, 2,5-dimethyl - 3 - hexyne - 2,5 - diol, 3,4 - epoxycyclohexane-1,1-dimethanol, 3-cyclohexene-1,1-dimethanol, glycerol, 1,2,6-hexanetriol, 1,1,1-trimethylolpropane, trimethylolmethane, polyvinyl alcohols, polyalkenyl alcohols, pentaerythritol, trimethylolphenol, inositol, diglycerol, pentaglycerol and the like and polyhydric phenols as hereinafter specified under the title of "Phenols."

Monofunctional organic compounds which contain in their molecule only one group capable of reacting with epoxy groups can be mixed and reacted with our epoxide compositions, using procedures which are similar to those specified herein, to form many different, new and useful materials. For example, unsaturated fatty acids such as those derived from drying oils such as cottonseed, corn, soybean, oiticica, tung, linseed, perilla oils and the like including oleic, linoleic, linolenic, licanic, eleostearic acids and the like, may be mixed and reacted with our epoxide compositions. Materials thus formed can be air-dried or baked to form hard, durable substances and are especially valuable in the manufacture of films and coatings. Representative monofunctional compounds, which may be mixed and reacted with our epoxide compositions are monohydric alcohols, saturated and unsaturated monocarboxylic acids, secondary monoamines, and the like.

Our epoxide compositions, and curable mixtures and resins made therefrom are useful in the manufacture of a large variety of useful articles such as, combs, brush handles, garden furniture, radio cabinet parts, structural parts, in the potting of electrical parts and the manufacture of protective coatings. Our epoxide compositions can be employed as heat and light stabilizers for chlorine containnig resins and may be employed in the manufacture of such condensation resins as phenol-formaldehyde resins, urea-formaldehyde resins, malamine-formaledehyde resins and the like to improve the physical properties, such as flexibility, of such resins. Our curable mixtures can be cast or molded using simplified procedures to make numerous articles. These compositions can accept large amounts of a variety of fillers which can impart special properties to resins formed therewith. They are particularly useful in making high temperature structural parts such as conduits for carrying hot fluids, structural parts for guided missiles and other high-speed aircraft, and tools and dies, such as those used in the automobile industry for stamping fenders, hoods and other automobile body parts. Our curable compositions are also particularly useful in making easily-applied protective coatings and can be cured to hard, durable coatings which are tough, chip resistant and resistant to attack by chemicals and which adhere tenaciously to surfaces of a wide variety of materials including glass and metals. These mixtures are also useful as bonding agents in making adhesives, abrasive wheels, laminates and the like. Our resins can be machined and polished to provide articles having various configurations and appealing appearances.

Many useful epoxide-containing compositions other than those specified hereinbefore can be made. Such epoxide-containing compositions are mixtures of bis(2,3-epoxycyclopentyl) ether and respectively, diepoxides of glycol bis-exo-dihydrodicyclopentadienyl ethers such as those described in U.S. Patent No. 2,543,419; polyepoxides formed by the reaction of halohydrins, e.g., epichlorhydrin, with polyhydric alcohols, e.g., ethylene glycol, glycerol, pentaerythritol; polymers and copolymers formed by vinyl-type addition polymerizations of ethylenically unsaturated epoxides, such as allyl glycidyl ether, allyl glycidyl phthalates, vinyl cyclohexene monoxides, and the like, alone, with other ethylenically unsaturated epoxides or with vinyl compounds, such as, ethylene, vinyl chloride, vinyl acetate, acrylonitrile styrene and the like; epoxides of butadiene polymers and copolymers or epoxides of substituted butadiene polymers and copolymers; epoxides of ethylenically unsaturated polyesters; dicyclopentadiene dioxide; bis(epoxycyclohexyl) terephthalates; and the like.

The following examples are presented. The physical properties listed therein were determined in accordance with ASTM testing methods. The following table identifies the testing procedure used in determining the listed physical properties.

| Physical Property | ASTM Test Procedure |
|---|---|
| Heat Distortion (° C.) | D-648 |
| Rockwell Hardness (M) | D-785 |
| Izod Impact | D-256 |
| Flexural Properties | D-790 |

Barcol hardness values specified in the examples were obtained through the employment of a Barcol Impressor GYZJ 934–1. Viscosity values given in the examples were determined with a Brookfield Synchro-Lectric viscometer. Unless otherwise specified, only parts by weight are given in the examples and room temperatures in the examples are temperatures in the range from 25° C. to 30° C.

EXAMPLE 1

*Preparation of bis(2-cyclopentenyl) ether*

Twelve hundred and forty-four grams, or 12.13 moles, of 1-chloro-2-cyclopentene and fourteen hundred grams of an aqueous sodium hydroxide solution containing 37.8 percent by weight of sodium hydroxide (i.e., containing five hundred and thirty grams of sodium hydroxide) were added simultaneously to a well-stirred solution of 27.9 grams of sodium hydroxide in four thousand grams of water. An addition time of one hour and forty minutes was employed. The temperature was maintained at 50° C. during the addition and the addition rates were adjusted so that the reaction mixture was at all time basic, that is having a pH of greater than 8. The reaction mixture separated into two layers during the reaction. After stirring for an additional hour, the layers were separated and the upper layer fractionated through a glass-packed column. Three hundred and thirty-seven grams of a fraction boiling at a temperature of 82° C. at 10 milliliters of mercury, absolute, were obtained. This fraction was identified as bis(2-cyclopentenyl) ether and had a refractive index of 1.4858 with sodium light at 30° C. The yield of bis(2-cyclopentenyl) ether was determined to be 37 percent of theoretical yield.

EXAMPLE 2

*Preparation of bis(2,3-epoxycyclopentyl) ether*

Three thousand and eighty-one grams of a 22.2 percent by weight solution of peracetic acid in acetone, i.e., a solution containing 9.0 moles of peracetic acid, were slowly added to 338 grams or 2.25 moles of bis(2-cyclopentenyl) ether. This addition required 5 hours during which the temperature of the reaction mixture was continuously maintained between 25° C. and 35° C. After stirring for an additional day at room temperature of about 25° C. and allowing to stand for 2 days at −6° C., the reaction mixture was analyzed for peracetic acid consumption and indicated that the reaction was 95 percent complete.

The reaction mixture then was fed into refluxing ethylbenzene to remove the acetone, acetic acid co-product formed by the reaction and excess peracetic acid. Low-boiling materials were stripped leaving a residue. Fractional distillation of the residue resulted in 320 grams (78 percent yield based on theoretical) of bis(2,3-epoxycyclopentyl) ether having a boiling point of 107° C. under a reduced pressure of 2.1 millimeters of mercury. Recrystallization of a solid mid-fraction from ethylbenzene produced a white crystalline product having a melting point of between 56° C. and 57° C. An elementary analysis of this product on the basis of $C_{10}H_{14}O_3$ provided the following results:

|  | Calculated, percent | Found, percent |
|---|---|---|
| Carbon, C | 65.91 | 65.88 |
| Hydrogen, H | 7.74 | 7.81 |
| Oxygen, O | 26.35 | 26.31 |

A purity of 96 percent theoretical was found by epoxide titration with pyridine hydrochloride.

EXAMPLE 3–A

*Preparation of polyglycidyl polyether of 4,4'-dihydroxydiphenyldimethylmethane* [1]

Two hundred and forty pounds of epichlorhydrin, 64 pounds of ethyl alcohol and 100 pounds of 4,4'-dihydroxydiphenyldimethylmethane, hereinafter referred to as bisphenol A, were charged to a stainless steel still equipped with a high speed agitator and reflux condenser and the mixture was heated to 60° C. at 325 to 350 millimeters of mercury, absolute pressure. Eighty-two pounds of 50 weight percent aqueous NaOH was then gradually added, with vigorous agitation, over a 3.5 hour period at such a rate that the reaction mass temperature remained below about 65° C. The reaction mass was stirred an additional 0.5 hour, then the alcohol and unreacted epichlorhydrin were removed by vacuum distillation at 50 mm. pressure to a pot temperature of 70° C. followed by vacuum steam distillation for 15 minutes at 70° C. to 80° C. at 50 mm. pressure leaving a viscous residue. The residue was then dissolved in toluene and the toluene solution washed with successive portions of water at 45° C. to 55° C. until the wash water was substantially neutral. The washed residue then was heated at an absolute pressure of 75 millimeters of mercury to a temperature of 135° C. to remove any residual toluene and vacuum steam distilled for 15 minutes at an absolute pressure of 50 millimeters of mercury and a temperature of 140° C. It was then vacuum dehydrated at an absolute pressure of 50 millimeters of mercury and a temperature of 140° C., cooled and discharged. The polyglycidyl polyether of bisphenol A prepared in this manner had a specific gravity of 1.16 grams per cubic centimeter at 25° C., a viscosity as determined in a Brookfield viscometer of 15,000 centipoises at 25° C. and an epoxy equivalent of 190 grams of polyglycidyl polyether per mole of epoxy group.

EXAMPLE 3–B

*Preparation of polyglycidyl polyether of bisphenol A*

About 1 mole of 4,4'-dihydroxydiphenyldimethylmethane and about 1.88 moles of sodium hydroxide as a 10 weight percent aqueous solution were mixed and heated to about 45° C. About 1.57 moles of epichlorhydrin were added while stirring the mixture. The temperature of the mixture was gradually increased to about 95° C. and maintained at this temperature for about one hour and twenty minutes. The mixture formed into an aqueous layer and a taffy-like residue. The aqueous layer was decanted and the residue was washed with hot water until the wash water was neutral to litmus. This residue which was the polyglycidyl polyether was drained and dried at about 130° C. This polyglycidyl polyether had a melting point of about 69° C. and an epoxide equivalent weight of about 500 grams of polyglycidyl polyether for each epoxy group contained thereby.

EXAMPLE 3–C

*Preparation of polyglycidyl polyether of bisphenol A*

About 4 moles of 4,4'-dihydroxydiphenyldimethylmethane and 5 moles of epichlorhydrin were added to ---
[1] Hereinafter referred to also as bisphenol A.

about 6.43 moles of sodium hydroxide as a 10 weight percent aqueous solution. The mixture thus obtained was gradually heated with stirring to about 100° C. over a period of about one hour and twenty minutes and was then maintained at a temperature in the range of 100° C. to 104° C. for an additional one hour while refluxing at atmospheric pressure. The reaction mixture formed an aqueous layer and a residue. The aqueous layer was decanted and the residue was washed with boiling water until the wash water was neutral to litmus. The residue, the polyglycidyl polyether, was drained and dried by heating to a temperature of about 150° C. This polyglycidyl polyether had a melting point of about 100° C. and an epoxide equivalent weight of about 860 grams of polyglycidyl polyether for each epoxy group.

EXAMPLE 3–D

*Preparation of polyglycidyl polyether of bisphenol A*

About 100 parts of a polyglycidyl polyether such as that prepared in Example 3–C was heated to about 150° C. and 7.75 parts of 4,4'-dihydroxydiphenyldimethylmethane was added. This mixture was heated over a period of about two hours during which time the temperature was gradually raised to 200° C. A solid polyglycidyl polyether having a melting point of about 148° C. and an epoxide equivalent weight of about 2780 grams of polyglycidyl polyether for each epoxy group was thus obtained.

EXAMPLES 4 THROUGH 7

*Epoxide compositions*

Epoxide compositions were prepared from a solid polyglycidyl polyether of bisphenol A, such as that prepared in Example 3–C, having a melting point range of 90° C. to 110° C. and an epoxide equivalent of 860 grams of polyglycidyl polyether per epoxy group, in amounts correspondingly listed in Table III below, and amounts of bis(2,3-epoxycyclopentyl) ether, also listed in Table III below. These epoxide compositions were made homogeneous by warming to a temperature of about 100° C. and then were cooled to about 25° C. These epoxide compositions were liquids having melting point ranges below 25° C. The viscosities of these compositions were measured at about 25° C. and are correspondingly listed in Table III. The epoxide compositions of Examples 5 and 6 can be advantageously used in bonding applications, for example, in providing a tenacious adhesive for glass or steel. The epoxide compositions of Examples 6 and 7, while they also may be used in bonding applications, can be advantageously used in the manufacture of castings and moldings.

Table III

| Example Number | Amount of Polyglycidyl Polyether | Amount of Bis(2,3-epoxycyclopentyl) Ether | Viscosity, Centipoises |
| --- | --- | --- | --- |
| 4 | 21.0 | 14.0 | Above $10^5$ |
| 5 | 21.0 | 21.0 | 97,400 |
| 6 | 21.0 | 31.5 | 15,700 |
| 7 | 21.0 | 49.0 | 2,580 |

EXAMPLES 8 THROUGH 17

*Resins from our epoxide compositions and a metal halide Lewis acid catalyst*

Ten liquid epoxide compositions were prepared from a polyglycidyl polyether, such as that prepared in Example 3–A, in amounts correspondingly listed in Table IV below and bis(2,3-epoxycyclopentyl) ether in amounts also correspondingly listed in Table IV. To each composition amounts of boron trifluoride-monoethylamine complex catalyst, as correspondingly listed in Table IV, were added thereby forming ten mixtures of catalyst and epoxide composition. Each mixture was heated until it became homogeneous (which occurred at about 58° C.) and then maintained at 120° C. until gels were formed. A gel was formed from each mixture in the times listed in Table IV. Each gel thus formed was then held at a temperature of 120° C. for periods of time correspondingly listed in Table IV. Thereafter, the temperature was raised to and held at 160° C. for 6 hours. A thermoset resin was formed from each of the ten mixtures. The properties of the resins, thus formed, are presented in Table IV.

Table IV

| Example Number | Amount of Polyglycidyl Polyether | Amount of Bis(2,3-epoxycyclopentyl) Ether | Amount of Catalyst (Grams) | Gel Time at 120° C. (Minutes) | Cure at 120° C. (Hours) | Resin Description |
| --- | --- | --- | --- | --- | --- | --- |
| 8 | 0.98 | 0.02 | 0.06 | 25 | 22.5 | Amber, tough, Barcol hardness of 25. |
| 9 | 0.95 | 0.05 | 0.06 | 25 | 22.5 | Brown, tough, Barcol hardness of 32. |
| 10 | 0.90 | 0.10 | 0.06 | 25 | 22.5 | Brown, tough, Barcol hardness of 35. |
| 11 | 0.80 | 0.20 | 0.06 | 25 | 22.5 | Brown, tough, Barcol hardness of 44. |
| 12 | 0.60 | 0.40 | 0.06 | 25 | 22.5 | Brown, tough, Barcol hardness of 41. |
| 13 | 0.40 | 0.60 | 0.06 | 25 | 22.5 | Brown, hard, charred internally. |
| 14 | 0.20 | 0.80 | 0.06 | 25 | 22.5 | Do. |
| 15 | 0.10 | 0.90 | 0.03 | 50 | 21.5 | Brown, tough, Barcol hardness of 32. |
| 16 | 0.05 | 0.95 | 0.03 | 40 | 18.5 | Brown, hard, tough. |
| 17 | 0.03 | 0.97 | 0.03 | 40 | 18.5 | Brown, tough, Barcol hardness of 20. |

EXAMPLE 18

*Resin from our epoxide composition and a metal halide Lewis acid catalyst*

A liquid epoxide composition containing 0.7 gram of bis(2,3-epoxycyclopentyl) ether and 0.3 gram of a polyglycidyl polyether, such as that prepared in Example 3–C, was prepared. About 0.03 gram of boron trifluoride-monoethylamine complex was added to the composition to form a mixture. This mixture contained 3 weight percent of boron trifluoride-monoethylamine complex based on the weight of the epoxide composition. The mixture was heated until it became homogeneous (occurring at about 100° C.) and then maintained at 120° C. for 5 hours, during which time a gel was formed. The gel was cured for an additional 6 hours at a temperature of 160° C. A hard, tough, thermoset resin was obtained.

EXAMPLES 19 THROUGH 25

*Resins from our epoxide compositions and a mineral acid catalyst*

Seven epoxide compositions were prepared from bis-(2,3-epoxycyclopentyl) ether and a polyglycidyl polyether, such as that prepared in Example 3–A, were mixed in the various relative proportions respectively listed in Table V below. To each of the compositions of Examples 19 through 21, 2 drops of a 25 weight percent aqueous solution of sulfuric acid was added. This amount of sulfuric acid, added to each of these three compositions, amounted to about 1 weight percent of sulfuric acid based on the weight of epoxide composition. To each of the compositions of Examples 22 through 25, 1 drop of a 25 weight percent aqueous solution of sulfuric acid was added. This amount of sulfuric acid amounted to 0.5 weight percent of sulfuric acid based on the weight of epoxide composition. All seven of the compositions were maintained at 120° C. for periods of time listed in Table V below, during which gels were formed. The gels, thus formed from each composition, were maintained at 120° C. for additional periods of time also correspondingly listed in Table V. Then, the temperature was raised to and held at 160° C. for 6 hours. Thermoset resins were obtained from every composition. The properties of these resins are correspondingly listed in Table V.

Example 27 ---- 0.42 gram of glycerol.
Example 28 ---- 1.54 grams of bisphenol A.
Example 29 ---- 1.02 grams of 2,4,6-trimethylolphenyl allyl ether.

were prepared. These mixtures each contained such amounts of bis(2,3-epoxycyclopentyl) ether, maleic anhydride and polyol as provided 1.33 carboxy equivalents of the anhydride and 0.33 hydroxyl equivalent of the polyol for each epoxy equivalent of the epoxide composition. These mixtures were warmed to 40° C. to 50° C. and became homogeneous. The temperatures of the mixtures were raised to and held at 120° C. for a period of 5 hours, during the first 1.5 hours thereof a gel formed from the mixtures of Examples 27 and 28 and during the first 3 hours thereof a gel formed from the mixture of Example 29. All gels were then heated to 160° C. and held thereat for 6 hours. Pale yellow, tough, infusible resins having Barcol hardness values of 51, 32 and 51, respectively, were obtained.

EXAMPLE 30–A

*Preparation of polyglycidyl polyetherdiethylenetriamine adduct*

Four hundred and seventy-five grams (1.25 moles) of a polyglycidyl polyether of bisphenol A, such as that produced in Example 3–A were added slowly and with vigorous agitation to 515 grams (5 moles) of diethylene-

*Table V*

| Example Number | Amount of Polyglycidyl Polyether | Amount of Bis(2,3-epoxycyclopentyl) Ether | Gel Time at 120° C. (Minutes) | Cure at 120° C. (Hours) | Resin Properties |
|---|---|---|---|---|---|
| 19 | 0.95 | 0.05 | 12 | 6.5 | Hard, tough. |
| 20 | 0.90 | 0.10 | 12 | 6.5 | Hard. |
| 21 | 0.80 | 0.20 | 12 | 6.5 | Do. |
| 22 | 0.40 | 0.60 | 35 | 4.8 | Tough, Barcol hardness of 37. |
| 23 | 0.20 | 0.80 | 45 | 4.5 | Tough, Barcol hardness of 43. |
| 24 | 0.10 | 0.90 | 240 | 4.5 | Tough, Barcol hardness of 44. |
| 25 | 0.05 | 0.95 | more than 300. | 21.0 | Tough, Barcol hardness of 37. |

EXAMPLE 26

*Resin from our epoxide composition and an alkali catalyst*

An epoxide composition containing 0.7 gram of bis-(2,3-epoxycyclopentyl) ether and 0.3 gram of polyglycidyl polyether, such as that prepared in Example 3–A, was prepared. About 2 drops of a 20 weight percent solution of potassium hydroxide in ethylene glycol was added to the composition thereby forming a mixture. This amount of catalyst provided a catalyst concentration of about 1.0 weight percent based on the total weight of epoxide composition. The mixture of catalyst and epoxide composition was maintained at 120° C. for about 4 hours, with gelation occurring after 1.5 hours. The temperature was then raised to and held at 160° C. for an additional 6 hours. A tough, thermoset resin having a Barcol hardness of 31 was obtained.

EXAMPLES 27, 28 AND 29

*Resin from our epoxide composition, maleic anhydride and polyols*

Three mixtures, each containing 5 grams of an epoxide composition, which contained 0.55 molar parts of bis-2,3-epoxycyclopentyl) ether and 100 parts of a polyglycidyl polyether of bisphenol A such as was prepared in Example 3–A, 2.66 grams of maleic anhydride and different amounts of different polyols as follows:

triamine. The addition rate was adjusted and cooling applied as needed to keep the reaction mass below a temperature of about 75° C. The adduct produced in this manner had a viscosity of 9,000 centipoises at 25° C., a specific gravity of 1.07 at 25° C. and amine equivalent of about 50 grams of adduct for each amino hydrogen atom.

EXAMPLE 30–B

*Preparation of ethylene oxide-diethylenetriamine adduct*

Five hundred and fifteen grams (5 moles) of diethylenetriamine and 515 grams of water were mixed in a 2-liter flask immersed in a cooling bath, the solution cooled to 17° C. and ethylene oxide was passed in through a sparger, with vigorous agitation, until 220 grams (5 moles) was absorbed. The addition, which required 3.5 hours, was performed at such a rate that the temperature of the reaction mixture did not rise above 25° C. The reaction mixture was then agitated one hour at room temperature and vacuum dehydrated.

The unreacted diethylenetriamine and other low-boiling components present were then removed by fractional distillation at 5 millimeters mercury absolute pressure to a vapor temperature of 165° C. The non-volatile adduct so obtained had a refractive index at 25° C. with sodium light of 1.5021 and an amine equivalent of 39 grams of adduct for each amino hydrogen atom.

EXAMPLE 30-C

*Preparation of ethylene oxide-diethylenetriamine adduct-phenol mixture*

A mixture of 100 parts of the ethylene oxide-diethylenetriamine adduct produced in Example 30-B and 30 parts of 4,4'-dihydroxydiphenyldimethylmethane, i.e., bisphenol A, was prepared. This mixture had a viscosity of 2,940 centipoises at 25° C. and an amine equivalent of 48 grams of mixtures per amino hydrogen atom contained thereby and a phenol equivalent of 500 grams of mixture per phenolic hydroxyl group contained thereby.

EXAMPLE 30-D

*Preparation of polyglycidyl-polyether-phenol-diethylenetriamine adduct*

A total of 25 parts of a polyglycidyl polyether of bisphenol A, such as that prepared in Example 3–A, were added to 50 parts of diethylenetriamine over a period of 3 to 4 hours while the temperature of the reaction vessel was maintained below about 65° C. After all of the polyether epoxide had been added, 25 parts of bisphenol A were added and allowed to dissolve while the temperature was maintained at 50° C. with cooling. The adduct thus formed had a viscosity of about 5000 centipoises at 25° C. and an amine equivalent of about 47 grams of adduct for each amino hydrogen.

EXAMPLES 31 THROUGH 40

*Resins from our epoxide compositions and polyfunctional amines*

Five epoxide compositions, Examples 31, 33, 35, 37 and 39, each containing 5.6 grams of a polyglycidyl polyether of bisphenol A, such as that prepared in Example 3–A, and 2.4 grams of bis(2,3-epoxycyclopentyl) ether were prepared. Each epoxide composition, thus prepared, contained 0.236 molar part of bis(2,3-epoxycyclopentyl) ether for each 100 parts by weight of the polyglycidyl polyether. To each epoxide composition, there were added various amounts of various polyfunctional amines, as listed in Table VI below to form five curable mixtures. The relative amount of polyfunctional amine and epoxide composition contained by each of these five mixtures provided the ratios of one amino hydrogen of the amine per epoxy group of the epoxide composition. An additional five mixtures, Examples 32, 34, 36, 38 and 40, each containing 8 grams of the polyglycidyl polyether as prepared in Example 3–A, and various amounts of various polyfunctional amines, also correspondingly listed in Table VI, were prepared. The proportions of polyfunctional amine and polyglycidyl polyether contained by the mixtures of Examples 32, 34, 36, 38 and 40 provided the ratios of one amino hydrogen of the amine per one epoxy group of the polyglycidyl polyether.

The curable mixtures of Examples 31, 33, 35, 37 and 39 were liquids of low viscosities, whereas the mixtures of Examples 32, 34, 36, 38 and 40 were liquids of correspondingly higher viscosities, some of which were very difficult to pour. Each mixture was maintained at a temperature of 80° C. and formed a gel in the times specified in Table VI. Each gel, thus formed, was maintained at 120° C. for the periods correspondingly listed in Table VI and then maintained at 160° C. for 6 hours. Resins were obtained from each mixture and had the properties correspondingly listed in Table VI.

Table VI

| Example Number | Polyfunctional Amine | Weight of Amine (Grams) | Gel Time at 80° C. (Minutes) | Cure at 120° C. (Hours) | Resin Description |
|---|---|---|---|---|---|
| 31 | p,p'-methylenedianiline | 2.80 | 108 | 7.0 | Tough, Barcol hardness of 45. |
| 32 | ---do--- | 2.08 | 64 | 2.5 | Tough, Barcol hardness of 37. |
| 33 | m-Xylylenediamine | 1.90 | 8 | 7.0 | Tough, Barcol hardness of 42. |
| 34 | ---do--- | 1.43 | 3 | 2.5 | Tough, Barcol hardness of 34. |
| 35 | Diethylenetriamine | 1.14 | 5 | 7.0 | Tough, Barcol hardness of 44. |
| 36 | ---do--- | 0.86 | 1 | 2.5 | Tough, Barcol hardness of 33. |
| 37 | 1,6-hexanediamine | 1.60 | 4 | 6.5 | Tough, Barcol hardness of 20. |
| 38 | ---do--- | 1.22 | 1 | 2.0 | Tough, charred, bubbled. |
| 39 | Ethylenediamine | 0.84 | 1 | 6.5 | Tough, Barcol hardness of 40. |
| 40 | ---do--- | 0.63 | 1 | 2.0 | Tough, charred, bubbled. |

EXAMPLES 41 AND 42

*Resins from our epoxide compositions and meta-xylylenediamine*

Two curable mixtures were prepared, one to be designated as Example 41 containing 35 grams of an epoxide composition was composed of 7 grams (0.038 molar part) of bis(2,3-epoxycyclopentyl) ether and 28 grams of a polyglycidyl polyether of bisphenol A, such as that prepared in Example 3–A, and 7.6 grams of m-xylylenediamine and the other to be designated as Example 42 containing 29.4 grams of a polyglycidyl polyether of bisphenol A, such as that prepared in Example 3–A, and 5.6 grams of m-xylylenediamine. The epoxide composition of Example 41 contained 0.137 molar part of bis(2,3-epoxycyclopentyl) ether per 100 parts of the polyglycidyl polyether. Both of said mixtures contained amounts of polyfunctional amine and epoxide composition as in Example 41 or polyglycidyl polyether as in Example 42 providing 1.0 amino hydrogen of polyfunctional amine per epoxy group of said epoxide composition or said polyglycidyl polyether. Viscosity determinations were made showing that the mixture of Example 41 containing our epoxide composition had a viscosity of 282 centipoises and the mixture of Example 42 had a viscosity of 1408 centipoises. The mixtures were poured into separate molds and allowed to stand over-night, a period of about 16 hours, at room temperature (about 27° C.) during which time gels were formed. The gels obtained from each mixture were subjected to a temperature of 120° C. for 1 to 2 hours and then maintained at 160° C. for 6 hours. Thermoset resins were formed from each mixture. The resin formed from the mixture of Example 41 containing our epoxide composition had a heat distortion point, at 264 pounds per square inch, of 124° C. The resin from the mixture of Example 42 had a heat distortion point, at 264 pounds per square inch, of 108° C.

EXAMPLE 43

*Resin from our epoxide composition and a polyglycidyl polyether-amine adduct*

An epoxide composition containing 6 grams of bis(2,3-epoxycyclopentyl) ether and 24 grams of a polyglycidyl polyether of bisphenol A, such as can be prepared in Example 3-A, having a viscosity of about 15,500 centipoises at 25° C., a melting point range of 8° C. to 12° C. and an epoxide equivalent weight of 190 grams of polyglycidyl polyether per epoxy group, was prepared. This epoxide composition contained 0.137 molar part of bis-(2,3-epoxycyclopentyl) ether per 100 parts of polyglycidyl polyether. The viscosity of this epoxide composition at 25° C. was found to be 2330. The epoxide composition was mixed with 7.35 grams of a polyglycidyl polyether-amine adduct, such as that prepared in Example 30-A, forming a curable mixture. The curable mixture contained amounts of polyfunctional amine and epoxide composition providing 0.8 amino hydrogen of the polyfunctional amine per epoxy group of the epoxide composition. The mixture was kept at room temperature, about 26° C., for 37 minutes, during which time a gel was formed. The gel was kept at room temperature, about 26° C., for 5.1 hours, after which time the temperature was raised to 160° C. and held there for 6 hours. A tough, thermoset resin, having a Barcol hardness of 46 and a heat distortion value of 131° C. was obtained.

EXAMPLE 44

*Resin from our epoxide composition and a polyglycidyl polyether-amine adduct*

Twenty-five grams of an epoxide composition containing 21 grams of a solid polyglycidyl polyether of bisphenol A, such as that prepared in Example 3-C, having a melting point range of 95° C. to 105° C. and an epoxide equivalent of 860 grams of polyglycidyl polyether per epoxy group, and 49 grams of bis(2,3-epoxycyclopentyl) ether were mixed with 9.85 grams of a polyglycidyl polyether-amine adduct, such as that prepared in Example 30-A, at room temperature (about 26° C.). The epoxide composition referred to above was a liquid at room temperature and contained 1.28 molar parts of bis(2,3-epoxycyclopentyl) ether per 100 parts by weight of the polyglycidyl polyether. The mixture thus prepared contained amounts of polyfunctional amine and epoxide composition providing one amino hydrogen per epoxy group. The temperature of the mixture was raised to 50° C. and held there until a gel was formed. requiring about 4.5 minutes. The gel was kept at a temperature of 150° C. for 68.5 hours and then the temperature was lowered to and maintained at 120° C. for 2 hours. An additional cure of about 6 hours at a temperature of about 160° C. was then applied to the mixture. An infusible resin, having a Barcol hardness of 53 and a heat distortion of 141° C., was thus obtained.

EXAMPLE 45

*Resin from our epoxide composition and diethylenetriamine*

An epoxide composition containing 0.2 gram of a polyglycidyl polyether of bisphenol A, such as that prepared in Example 3-D, having a melting point range of 145° C. to 155° C., and an epoxide equivalent weight of 2400 to 4000, and 0.8 gram of bis(2,3-epoxycyclopentyl) ether was prepared and heated until it became homogeneous (occurring at about 110° C.). This homogeneous epoxide composition was cooled to room temperature and was found to have a viscosity of less than 5000 centipoises at room temperature (about 27° C.). The epoxide composition contained 2.2 molar parts of bis(2,3-epoxycyclopentyl) ether per 100 parts of the polyglycidyl polyether. About 0.19 gram of diethylenetriamine was added to the homogeneous composition to form a curable mixture. This mixture contained such amounts of polyfunctional amine and epoxide composition as to provide 1.0 amino hydrogen of the amine for each epoxy group of the epoxide composition. The mixture was then heated to 120° C. and maintained there until a gel was formed, requiring about 6 minutes. The gel was held at 120° C. for an additional 1.4 hours and then the temperature was raised to and maintained at 160° C. for 6 hours. A tough, acetone-resistant, thermoset resin, having a Barcol hardness of 46, was obtained.

EXAMPLES 46 THROUGH 54

*Epoxide compositions and resins made therefrom*

Eight epoxide compositions were prepared from a polyglycidyl polyether of bisphenol A, such as that formed in Example 3-A, and bis(2,3-epoxycyclopentyl) ether in the respective proportions correspondingly specified in Table VII below. The ratio of molar parts of bis(2,3-epoxycyclopentyl) ether per 100 parts by weight of polyglycidyl polyether for each epoxide composition is correspondingly listed in Table VII. One control sample (Example 46) comprised of only a polyglycidyl polyether, such as that identified above was prepared for purposes of comparison and is also listed in Table VII. The viscosities of each mixture and the control sample were determined with a Brookfield Syncro-Lectric Viscometer, Model LVF and are also correspondingly listed in Table VII. To each epoxide composition and the control sample there was added a polyfunctional amine which is a polyglycidyl polyether-diethylenetriamine adduct, such as that prepared in Example 30-A, in proportions as specified in the table below to form a curable mixture. Each of these mixtures contained such amounts of polyfunctional amine and epoxide composition as to provide 1.0 amino hydrogen of the amine for each epoxy group of the epoxide composition. The mixtures were brought to a temperature of 50° C. and held there until gels were formed. The times to form a gel for each mixture are listed in the last column of Table VII. The gels thus formed from these mixtures were then cured for 1 hour at 100° C. and then for 2 hours at 160° C. Each gel formed a hard, infusible resin.

TABLE VII

| Example Number | Molar Parts of Bis(2,3-epoxy-cyclopentyl) Ether/100 Parts of Polyglycidyl Polyether | Viscosity (Centipoises at 27° C.) | Parts of Amine-Epoxide Adduct/100 Parts of Epoxide Composition | Gel Time at 50° C. (Minutes) |
|---|---|---|---|---|
| 46 | 0.000 | 17,200 | 25.0 | 9. |
| 47 | 0.011 | 15,640 | 25.5 | 10. |
| 48 | 0.061 | 4,600 | 27.8 | 10. |
| 49 | 0.137 | 2,300 | 30.7 | 15. |
| 50 | 0.366 | 600 | 36.8 | 35. |
| 51 | 0.825 | 148 | | 25-30 hours. |
| 52 | 1.281 | 90 | 47.9 | 25-30 hours. |
| 53 | 4.950 | 48 | 53.3 | 40-50 hours. |
| 54 | 29.600 | 36 | 53.5 | 68 hours. |

EXAMPLES 55 THROUGH 57

*Resins from epoxide compositions and polyglycidyl polyether-diethylenetriamine adducts*

Two epoxide compositions of a polyglycidyl polyether, such as that made in Example 3-A, and bis(2,3-epoxycyclopentyl) ether were prepared in the respective proportions correspondingly listed in Table VIII below. The ratio of molar parts of bis(2,3-epoxycyclopentyl) ether per 100 parts of the polyglycidyl polyether contained by each epoxide composition is correspondingly listed in the table below. A control sample (Example 55) comprising only the polyglycidyl polyether identified above was also prepared and is listed in the table. The viscosity of each epoxide composition and of the control sample were measured and are also recorded in Table VIII. The two compositions and the control sample then were each mixed at room temperature with the proportions as respectively listed in Table VIII of a polyfunctional amine, which is a polyglycidyl polyether-phenol-diethylenetriamine adduct, such as that made in Example 30-D, to form four curable mixtures. Each mixture contained such amounts of polyfunctional amine and epoxide composition, or control sample, as to provide 1.0 amino hydrogen of the amine for each epoxy group of the epoxide composition, or control sample. All of the mixtures then were allowed to cure at room temperature (about 25° C.) for a period of 7 days. During this period each mixture formed an infusible resin having the properties correspondingly listed in Table VIII.

*Table VIII*

| Example Number | 55 | 56 | 57 |
|---|---|---|---|
| Parts by Weight of Polyglycidyl Polyether | 100 | 90 | 80 |
| Parts by Weight of Bis(2,3-epoxycyclopentyl) Ether | 0 | 10 | 20 |
| Molar Parts of Bis(2,3-epoxycyclopentyl) Ether/100 Parts of Polyglycidyl Polyether | 0 | 0.061 | 0.137 |
| Viscosity of Epoxide Composition (Centipoise 25° C.) | 11,600 | 4,800 | 1,660 |
| Parts by Weight of Polyfunctional Amine | 20.0 | 22.3 | 24.6 |
| Izod Impact | 0.19 | 0.28 | 0.28 |
| Flexural Strength (p.s.i.) | 6,400 | 10,600 | 14,200 |
| Flexural Tangent (at the proportional limit) | 6,400 | 10,600 | 10,600 |

EXAMPLES 58 AND 59

*Resins from epoxide compositions and ethylene oxide-diethylenetriamine adducts*

A mixture, designated as Example 59, was prepared at room temperature from an epoxide composition containing a polyglycidyl polyether, such as that prepared in Example 3-A, bis(2,3-epoxycyclopentyl) ether and a polyfunctional amine which is an ethylene oxide-diethylenetriamine adduct, such as that prepared in Example 30-B. The epoxide composition from which this mixture was prepared contained the molar parts of bis(2-3-epoxycyclopentyl) ether per 100 parts by weight of the polyglycidyl polyether correspondingly listed in Table IX. A second mixture, designated as Example 58, was prepared from the same polyglycidyl polyether and the same polyfunctional amine. The proportions of polyglycidyl polyether, bis(2,3-epoxycyclopentyl) ether and polyfunctional amine in each of these mixtures are listed correspondingly in Table IX below. The amounts of polyfunctional amine and epoxide composition, in the caes of Example 59, or polyglycidyl polyether, in the case of Example 58, were such as to provide about one amino hydrogen of the amine for each epoxy group of the epoxide composition or polyglycidyl polyether. Each mixture was subjected to a room temperature (25° C.) cure for about 7 days. At the end of this time under these conditions each of the mixtures had formed an infusible resin having the properties correspondingly listed in Table IX.

*Table IX*

| Example Number | 58 | 59 |
|---|---|---|
| Parts by Weight of Polyglycidyl Polyether | 100 | 80 |
| Parts by Weight of Bis(2,3-epoxycyclopentyl) Ether | 0 | 20 |
| Molar Parts of Bis(2,3-epoxycyclopentyl) Ether/100 Parts of Polyglycidyl Polyether | 0 | 0.137 |
| Parts by Weight of Polyfunctional Amine | 20.0 | 24.6 |
| Izod Impact (Foot lbs./square inch) | 0.25 | 0.58 |
| Flexural Strength (p.s.i.) | 8,100 | 13,500 |

EXAMPLES 60 THROUGH 63

*Resins from our epoxide compositions and polyglycidyl polyether-diethylenetriamine adducts*

Three epoxide compositions (Examples 61, 62 and 63) were prepared from bis(2,3-epoxycyclopentyl) ether and a polyglycidyl polyether of bisphenol A, such as that prepared in Txample 3-A, in the relative proportions correspondingly listed in Table X below. The ratio of molar parts of bis(2,3-epoxycyclopentyl) ether per 100 parts by weight of polyglycidyl polyether for each epoxide composition is also correspondingly listed in Table X. One control sample (Example 60) consisting of the polyglycidal polyether identified above was prepared for comparison and is also listed in Table X. A polyfunctional amine which is a polyglycidyl polyether-diethylenetriamine adduct, such as that prepared in Example 30-A, was added at room temperature to each of the three epoxide compositions and to the control sample in amounts specified in the table below so as to provide four mixtures. Each of these mixtures contained such amounts of polyfunctional amine and epoxide compositions or control sample as to provide about one amino hydrogen of the polyfunctional amine for each epoxy group of the epoxide compositions or control sample. The four mixtures were allowed to stand at room temperature, about 25° C., for 20 hours and then were heated to 120° C. at which temperature they were maintained for about 2 hours. Infusible resins were formed from each mixture and were cooled to room temperature. Physical properties of these resins were measured at room temperature and are correspondingly listed in Table X.

*Table X*

| Example Number | 60 | 61 | 62 | 63 |
|---|---|---|---|---|
| Parts by Weight of Polyglycidyl Polyether | 100 | 90 | 80 | 70 |
| Parts by Weight of Bis(2,3-epoxycyclopentyl) Ether | 0 | 10 | 20 | 30 |
| Molar Parts of Bis(2,3-epoxycyclopentyl) Ether/100 Parts of Polyglycidyl Polyether | 0 | 0.061 | 0.137 | 0.246 |
| Parts by Weight of Polyfunctional Amine | 25 | 26.9 | 30.8 | 32.6 |
| Compressive Yield | 9,800 | 17,200 | 18,500 | 18,600 |
| Flexural Strength | 15,000 | 18,800 | 19,600 | 21,100 |
| Flexural Modulus×10$^{-6}$ | 0.40 | 0.48 | 0.50 | 0.54 |
| Rockwell Hardness (M) | 106 | 107 | 108 | 108 |

EXAMPLES 64 THROUGH 66

*Resins from our epoxide compositions and ethylene oxide-diethylenetriamine adduct-phenol mixture*

Two epoxide compositions (Examples 65 and 66) were prepared from bis(2,3-epoxycyclopentyl) ether and a polyglycidyl polyether of bisphenol A, such as that prepared in Example 3-A, in the relative proportions correspondingly listed in Table XI below. The ratio of molar parts of bis(2,3-epoxycyclopentyl) ether per 100 parts by weight of polyglycidyl polyether for each epoxide composition is also correspondingly listed in Table XI. One control sample (Example 64) consisting of the polyglycidyl polyether identified above was prepared for comparison purposes and is also listed in Table XI. A polyfunctional amine which is an ethylene oxide-diethylenetriamine adduct-bisphenol A mixture, such as that prepared in Example 30-D, was added at room temperature to each of the two epoxide compositions and to the control sample in the amounts specified in the table below, so as to provide three mixtures. Each of these contained such amounts of polyfunctional amine and epoxide compositions, or control sample, as to provide one amino hydrogen of the polyfunctional amine for each epoxy group of the epoxide compositions, or control sample. The three mixtures were allowed to stand at room temperature, about 25° C., for 20 hours and then were heated to 120° C. at which temperature they were maintained for about 2 hours. Infusible resins were thus formed from each mixture and were cooled to room temperature. Physical properties of these resins were measured at room temperature and are correspondingly listed in Table XI.

*Table XI*

| Example Number | 64 | 65 | 66 |
| --- | --- | --- | --- |
| Parts by Weight of Polyglycidyl Polyether | 100 | 80 | 70 |
| Parts by Weight of Bis (2,3-epoxycyclopentyl) Ether | 0 | 20 | 30 |
| Molar Parts of Bis (2,3-epoxycyclopentyl) Ether/100 Parts of Polyglycidyl Polyether | 0 | 0.137 | 0.246 |
| Parts by Weight of Polyfunctional Amine | 25.3 | 31.1 | 33.9 |
| Flexural Strength | 15,500 | 19,300 | 20,300 |
| Flexural Modulus ×10⁻⁶ | 0.47 | 0.56 | 0.59 |
| Rockwell Hardness (M) | 100 | 101 | 100 |

EXAMPLES 67 AND 68

*Resins from our epoxide compositions and ethylene oxide-diethylenetriamine adduct-phenol mixtures*

An epoxide composition (Example 68) was prepared from bis(2,3-epoxycyclopentyl) ether and a polyglycidyl polyether of bisphenol A, such as that prepared in Example 3–A, having a viscosity of about 15,500 centipoises at 25° C. and an epoxide equivalent of about 190 grams of the polyglycidyl polyether for each epoxy group contained thereby. The relative amount of the bis(2,3-epoxycyclopentyl) ether and the polyglicidyl polyether contained by this epoxide composition and the ratio of molar parts of bis (2,3-epoxycyclopentyl) ether per 100 parts by weight of polyglycidyl polyether for each epoxide composition is correspondingly listed in Table XII below. One control sample (Example 67) consisting of the polyglycidyl polyether identified above was prepared for comparison purposes and is also listed in Table XII. A polyfunctional amine which is an ethylene oxide-diethylenetriamine adduct-bisphenol A mixture, such as that prepared in Example 30–D, was added at room temperature to the epoxide composition and to the control sample in the amounts specified in the table below, so as to provide two mixtures. Each of these mixtures contained such amounts of polyfunctional amine and epoxide composition or control sample as to provide one amino hydrogen of the polyfunctional amine for each epoxy group of the epoxide composition or control sample. The two mixtures were allowed to stand at room temperature, about 25° C., for 20 hours, then were heated to 120° C. at which temperature they were maintained for 2 hours, and finally were heated to about 200° C. at which temperature they were maintained for an additional 20 hours. Infusible resins were thus formed from each mixture and were cooled to room temperature. Physical properties of these resins were measured at room temperature (25° C.) and are correspondingly listed in the table below.

*Table XII*

| Example Number | 67 | 68 |
| --- | --- | --- |
| Parts by Weight of Polyglycidyl Polyether | 100 | 80 |
| Parts by Weight of Bis (2,3-epoxycyclopentyl) Ether | 0 | 20 |
| Molar Parts of Bis (2,3-epoxycyclopentyl) Ether/ 100 Parts by Weight of Polyglycidyl Polyether | 0 | 0.137 |
| Parts by Weight of Polyfunctional Amine | 25.3 | 31.1 |
| Flexural Strength | 12,600 | 16,500 |
| Flexural Modulus ×10⁻⁶ | 0.48 | 0.54 |
| Rockwell Hardness (M) | 101 | 109 |

EXAMPLE 69

*Resin from our epoxide composition and a dicarboxylic acid anhydride*

An epoxide composition containing 8.0 grams of a polyglycidyl polyether of bisphenol A, such as that prepared in Example 3–B, having a melting point range of 64° C. to 76° C. and an epoxide equivalent weight range of 450 to 525, and 2.0 grams of bis(2,3-epoxycyclopentyl) ether was prepared and warmed slowly until a homogeneous composition was formed (this occurring at about 75° C.). This epoxide composition contained a ratio of 0.137 molar part of bis(2,3-epoxycyclopentyl) ether for 100 parts of polyglycidyl polyether. The homogeneous composition had a viscosity below 5,000 centipoises at a temperature of about 75° C. and had a melting point of around 40° C. The composition was held at a temperature of 100° C. while 4.7 grams of phthalic anhydride was added to form a homogeneous mixture. This mixture contained such amounts of epoxide composition and polycarboxylic acid anhydride as to provide 1.65 carboxy equivalents of the anhydride for each epoxy group of the epoxide composition. The mixture temperature was then raised to about 120° C. and held there for about 4.5 hours. At the end of about 1.6 hours, a gel was formed from the mixture. The gel, thus formed, was maintained at 160° C. for 6 hours and an infusible resin was formed. This resin was amber-colored, tough, and acetone-resistant and had a Barcol hardness of 40.

EXAMPLE 70

*Resin from our epoxide composition and a dicarboxylic acid*

An epoxide composition containing 8.0 grams of polyglycidyl polyether of bisphenol A, as prepared in Example 3–B, having a melting point range of 64° C. to 76° C., and an epoxide equivalent of 450 to 525 grams of polyglycidyl polyether per epoxy group, and 2.0 grams of bis(2,3-epoxycyclopentyl) ether was prepared. This epoxide composition contained 0.137 molar part of bis(2,3-epoxycyclopentyl) ether for 100 parts of polyglycidyl polyether. The composition was heated to about 100° C. and about 2.32 grams of adipic acid was added thereto. A homogeneous mixture was obtained at this temperature. The mixture contained such amounts of epoxide composition and polycarboxylic acid as to provide 0.8 carboxy equivalent of the acid for each epoxy group of the epoxide composition. The mixture was maintained at 120° C. for about 3.4 hours, during which time a gel was obtained. This gel was held at 120° C. for an additional 1 hour and then raised to and maintained at a temperature of 160° C. for 6 hours. A light amber, tough, infusible resin, having a Barcol hardness of 25, was formed.

What is claimed is:

1. An epoxide composition comprising a polyglycidyl polyether of a polyhydric phenol and bis(2,3-epoxycyclopentyl) ether in the proportions of 0.01 to 10.0 molar parts of bis (2,3-epoxycyclopentyl) ether to 100 parts by weight of polyglycidyl polyether.

2. An epoxide composition comprising a polyglycidyl polyether of a polyhydric phenol and bis (2,3-epoxycyclopentyl) ether in the proportions of 0.1 to 1.0 molar part of bis(2,3-epoxycyclopentyl) ether to 100 parts by weight of polyglycidyl polyether.

3. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-expoxycyclopentyl) ether to 100 parts by weight of polyglycidyl polyether, and a cross-linking compound from the class of organic compounds having chemically combined therein a member from the class consisting of at least one oxydicarbonyl group of a polycarboxylic acid anhydride, at least two hydroxyl groups and at least two amino hydrogen atoms.

4. A curable mixture comprising an epoxide composition comprised of a polyglycidyl polyether of a polyhydric phenol and bis(2,3-epoxycyclopentyl) ether in the proportions of 0.1 to 1.0 molar part of bis(2,3-expoxycyclopentyl) ether to 100 parts by weight of polyglycidyl polyether, and a cross-linking compound from the class of organic compounds having chemically combined therein a member from the class consisting of at least one oxydicarbonyl group of a polycarboxylic acid anhydride, at least two hydroxyl groups and at least two amino hydrogen atoms.

5. A curable mixture comprising an epoxide composition comprising of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether, and a polyfunctional amine.

6. A curable mixture comprising an epoxide composition comprised of a polyglycidyl polyether of a polyhydric phenol and bis(2,3-epoxycyclopentyl) ether in the proportions of 0.1 to 1.0 molar part of bis(2,3-epoxycyclopentyl) ether to 100 parts by weight of polyglycidyl polyether, and a polyfunctional amine.

7. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether, and a polyfunctional amine in such proportions as to provide 0.2 to 4.0 amino hydrogen atoms of the polyfunctional amine for each epoxy group of the epoxide composition.

8. A curable mixture comprising an epoxide composition comprised of a polyglycidyl polyether of a polyhydric phenol and bis(2,3-epoxycyclopentyl) ether in the proportions of 0.1 to 1.0 molar part of bis(2,3-epoxycyclopentyl) ether to 100 parts by weight of polyglycidyl polyether, and a polyfunctional amine in such proportions as to provide 0.2 to 4.0 amino hydrogen atoms of the polyfunctional amine for each epoxy group of the epoxide composition.

9. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether and a polycarboxylic acid.

10. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether and a polycarboxylic acid in such amount as to provide 0.3 to 2.5 carboxyl equivalents of the polycarboxylic acid for each epoxy group of the epoxide composition.

11. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether, and a polycarboxylic acid in such amount as to provide 0.3 to 2.5 carboxy equivalents of the acid for each epoxy group of the epoxide composition.

12. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether a polycarboxylic acid and a polycarboxylic acid anhydride in such amounts as to provide not more than 1.5 carboxy equivalents from the anhydride and 0.3 to 3.0 carboxy equivalents of the combined amounts of acid and anhydride for each epoxy group contained by the amount of epoxide composition, the number of carboxy equivalents from the acid being greater than the number of carboxy equivalents from the anhydride.

13. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether and a polycarboxylic acid anhydride.

14. A curable mixture comprising an epoxide composition comprised of a polyglycidyl polyether of a polyhydric phenol and bis(2,3-epoxycyclopentyl) ether in the proportions of 0.1 to 1.0 molar part of bis(2,3-epoxycyclopentyl) ether to 100 parts by weight of polyglycidyl polyether and a polycarboxylic acid anhydride in such amount as to provide 0.3 to 3.0 carboxy equivalents from the anhydride for each epoxy group contained by the amount of epoxide composition.

15. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether and a polycarboxylic acid anhydride in such amount as to provide 0.3 to 3.0 carboxy equivalents from the anhydride for each epoxy group contained by the amount of epoxide composition.

16. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether a polycarboxylic acid anhydride and a polycarboxylic acid in such relative amounts as to provide not more than 1.5 carboxy equivalents from the acid and from 0.3 to 3.0 carboxy equivalents from the combined amounts of acid and anhydride for each epoxy group contained by the amount of epoxide composition, the number of carboxy equivalents from the anhydride being at least equal to the number of carboxy equivalents from the acid.

17. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether, a polycarboxylic acid anhydride and a polyol.

18. A curable mixture comprising an epoxide composition comprised of a polyglycidyl polyether of a polyhydric phenol and bis(2,3-epoxycyclopentyl) ether in the proportions of 0.1 to 1.0 molar part of bis(2,3-epoxycyclopentyl) ether to 100 parts by weight of polyglycidyl polyether, a polycarboxylic acid anhydride in such amounts as to provide 0.33 to 4.0 carboxy equivalents for each epoxy group contained by the amount of epoxide composition, and a polyol in such amounts as to provide up to 3.0 hydroxyl groups for each epoxy group of the epoxide composition.

19. A curable mixture comprising an epoxide composition comprised of a polyglycidyl polyether of a polyhydric phenol and bis(2,3-epoxycyclopentyl) ether in the proportions of 0.01 to 10.0 molar parts of bis(2,3-epoxycyclopentyl) ether to 100 parts by weight of polyglycidyl polyether, a polycarboxylic acid anhydride in such amounts as to provide 0.33 to 4.0 carboxy equivalents for each epoxy group contained by the amount of epoxide compositions, and a polyol in such amounts as to provide up to 3.0 hydroxyl groups for each epoxy group of the epoxide composition.

20. A resin-forming process comprising reacting together in the presence of an ionic catalyst bis(2,3-epoxycyclopentyl) ether and a polyglycidyl polyether of a polyhydric phenol in the proportions of 0.01 to 10.0 molar parts of bis(2,3-epoxycyclopentyl) ether to 100 parts by weight of polyglycidyl polyether at temperatures not higher than 250° C.

21. A resin-forming process comprising reacting together bis(2,3-epoxycyclopentyl) ether and a polyglycidyl polyether of a polyhydric phenol in the proportions of 0.01 to 10.0 molar parts of bis(2,3-epoxycyclopentyl) ether to 100 parts by weight of polyglycidyl polyether in the presence of an ionic catalyst at temperatures in the 50° C. to 200° C. range.

22. A resin comprising a polymerized composition of claim 1.

23. A resin comprising a polymerized composition of claim 2.

24. A resin comprising a polymerized mixture of claim 3.
25. A resin comprising a polymerized mixture of claim 4.
26. A resin comprising a polymerized mixture of claim 5.
27. A resin comprising a polymerized mixture of claim 6.
28. A resin comprising a polymerized mixture of claim 7.
29. A resin comprising a polymerized mixture of claim 8.
30. A resin comprising a polymerized mixture of claim 9.
31. A resin comprising a polymerized mixture of claim 10.
32. A resin comprising a polymerized mixture of claim 11.
33. A resin comprising a polymerized mixture of claim 12.
34. A resin comprising a polymerized mixture of claim 13.
35. A resin comprising a polymerized mixture of claim 14.
36. A resin comprising a polymerized mixture of claim 15.
37. A resin comprising a polymerized mixture of claim 16.
38. A resin comprising a polymerized mixture of claim 17.
39. A resin comprising a polymerized mixture of claim 18.
40. A resin comprising a polymerized mixture of claim 19.
41. A resin-forming process comprising reacting together bis(2,3-epoxylcyclopentyl) ether, a polyglycidyl polyether of a polyhydric phenol in the proportions of 0.01 to 10.0 molar parts of bis(2,3-epoxycylopentyl) ether to 100 parts by weight of polyglycidyl polyether, and a cross-linking compound selected from the group consisting of polycarboxylic acids, polycarboxylic acid anhydrides, polyols, and polyfunctional amines, at temperatures not higher than 250° C.
42. A resin-forming process comprising reacting together bis(2,3-epoxycyclopentyl) ether, a polyglycidyl polyether of a polyhydric phenol in the proportions of 0.01 to 10.0 molar parts of bis(2,3-epoxycyclopentyl) ether to 100 parts by weight of polyglycidyl polyether, and a cross-linking compound selected from the group consisting of polycarboxylic acids, polycarboxylic acid anhydrides, polyols, and polyfunctional amines, at a temperature in the range of from 20° C. to 200° C.

References Cited in the file of this patent
UNITED STATES PATENTS

| | | |
|---|---|---|
| 2,735,829 | Wiles et al. | Feb. 21, 1956 |
| 2,739,161 | Carlson | Mar. 20, 1956 |
| 2,744,845 | Rudoff | May 8, 1956 |